(12) United States Patent
Rabipour et al.

(10) Patent No.: US 9,769,320 B2
(45) Date of Patent: *Sep. 19, 2017

(54) MECHANISM FOR DYNAMIC SIGNALING OF ENCODER CAPABILITIES

(71) Applicant: Telefonaktiebolaget L M Ericsson (publ), Stockholm (SE)

(72) Inventors: Rafi Rabipour, Cote Saint-Luc (CA); Chung-Cheung Chu, Brossard (CA); Daniel Cohn, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 21 days.

This patent is subject to a terminal disclaimer.

(21) Appl. No.: 15/003,221

(22) Filed: Jan. 21, 2016

(65) Prior Publication Data
US 2016/0142552 A1 May 19, 2016

Related U.S. Application Data

(63) Continuation of application No. 13/588,445, filed on Aug. 17, 2012, now Pat. No. 9,277,057.
(Continued)

(51) Int. Cl.
*H04L 12/28* (2006.01)
*H04M 7/00* (2006.01)
(Continued)

(52) U.S. Cl.
CPC .......... *H04M 7/0072* (2013.01); *G10L 19/00* (2013.01); *H04L 65/1059* (2013.01);
(Continued)

(58) Field of Classification Search
USPC ........................................ 370/252, 329, 386
See application file for complete search history.

(56) References Cited

U.S. PATENT DOCUMENTS

| 6,070,089 A | 5/2000 | Brophy et al. |
| 9,277,057 B2 | 3/2016 | Rabipour et al. |

(Continued)

FOREIGN PATENT DOCUMENTS

| EP | 1107538 A2 | 6/2001 |
| WO | 2006038839 A1 | 4/2006 |
| WO | 2007098783 A1 | 9/2007 |

OTHER PUBLICATIONS

Fang, Zheng, "RTP payload format for Enhanced Variable Rate Narrowband-Wideband Codec (EVRC-NW)," draft-ietf-avt-rtp-evrc-nw-03, Network Working Group, Internet-Draft, Intended Status: Standards Track, Apr. 23, 2011, 56 pages.
(Continued)

*Primary Examiner* — John Pezzlo
(74) *Attorney, Agent, or Firm* — Withrow & Terranova, PLLC

(57) ABSTRACT

The present disclosure provides systems and methods for dynamically signaling encoder capabilities of vocoders of corresponding communication nodes. In one embodiment, during a call between a first communication node and a second communication node, a control node (e.g., base station controller or mobile switching center) for the first communication node sends capability information for a voice encoder of a vocoder of the first communication node to a control node for the second communication node. As a result, the second communication node is enabled to select and request a preferred encoder mode for the voice encoder of the vocoder of the first communication node based on the capabilities of the voice encoder of the vocoder of the first communication node.

18 Claims, 18 Drawing Sheets

Related U.S. Application Data

(60) Provisional application No. 61/524,386, filed on Aug. 17, 2011, provisional application No. 61/531,796, filed on Sep. 7, 2011.

(51) Int. Cl.

| | | |
|---|---|---|
| *H04W 28/18* | (2009.01) | |
| *G10L 19/00* | (2013.01) | |
| *H04L 29/06* | (2006.01) | |
| *H04J 1/16* | (2006.01) | |
| *H04W 88/18* | (2009.01) | |

(52) U.S. Cl.
CPC .......... *H04L 65/608* (2013.01); *H04W 28/18* (2013.01); *H04W 88/181* (2013.01)

(56) References Cited

U.S. PATENT DOCUMENTS

| | | | |
|---|---|---|---|
| 2002/0191556 A1* | 12/2002 | Krishnarajah | H04W 28/06 370/329 |
| 2003/0123659 A1 | 7/2003 | Forstrom et al. | |
| 2003/0210659 A1 | 11/2003 | Chu et al. | |
| 2005/0037790 A1 | 2/2005 | Chang | |
| 2005/0213605 A1 | 9/2005 | Kim et al. | |
| 2006/0077987 A1 | 4/2006 | Qi et al. | |
| 2006/0174015 A1 | 8/2006 | Arauz-Rosado | |
| 2007/0230409 A1 | 10/2007 | Semper et al. | |
| 2008/0219244 A1 | 9/2008 | Malhotra et al. | |
| 2009/0047936 A1 | 2/2009 | Kampmann et al. | |
| 2009/0076802 A1 | 3/2009 | Witzel et al. | |
| 2009/0116458 A1* | 5/2009 | Ramesh | H04L 65/605 370/336 |
| 2009/0154658 A1 | 6/2009 | Kasper et al. | |
| 2009/0290573 A1 | 11/2009 | Belling et al. | |
| 2010/0067565 A1 | 3/2010 | Hirano et al. | |
| 2010/0195563 A1* | 8/2010 | Jong | H04B 7/18513 370/321 |
| 2011/0158096 A1* | 6/2011 | Leung | H04L 1/0079 370/232 |
| 2011/0188456 A1 | 8/2011 | Rawat et al. | |
| 2013/0046534 A1 | 2/2013 | Rabipour et al. | |

OTHER PUBLICATIONS

Li, Adam, RTP Payload Format for Enhanced Variable Rate Codecs (EVRC) and Selectable Mode Vocoders (SMV), Network Working Group, Request for Comments: 3558, Category: Standards Track, Jul. 2003, The Internet Society, pp. 1-23.

Schulzrinne, Henning L, et al., "RTP: A Transport Protocol for Real-Time Applications," Network Working Group, Request for Comments: 3550, Obsoletes: 1889, Category: Standards Track, Jul. 2003, The Internet Society, pp. 1-89.

Xie, Qiaobing, et al., "Enhancements to RTP Payload Formats for EVRC Family Codecs," Network Working Group, Request for Comments: 4788, Updates: 3558, Category: Standards Track, Jan. 2007, The IETF Trust, pp. 1-22.

International Search Report and Written Opinion for PCT/IB20012/054202, mailed Mar. 27, 2013, 17 pages.

Invitation to Pay Additional Fees for International Patent Application PCT/IB2012/054202 mailed Jan. 23, 2013, 6 pages.

Translation of Second Office Action for Chinese Patent Application No. 201280051193.2, issued Feb. 26, 2016, 17 pages.

Extended European Search Report for European Patent Application No. 14002789.7, mailed Dec. 8, 2014, 6 pages.

International Preliminary Report on Patentability for PCT/IB2012/054202 mailed Feb. 27, 2014, 11 pages.

Non-final Office Action for U.S. Appl. No. 13/588,445 mailed May 9, 2014, 35 pages.

Final Office Action for U.S. Appl. No. 13/588,445, mailed Feb. 5, 2015, 49 pages.

Advisory Action for U.S. Appl. No. 13/588,445, mailed Jun. 1, 2015, 3 pages.

Notice of Allowance for U.S. Appl. No. 13/588,445, mailed Nov. 23, 2015, 11 pages.

\* cited by examiner

```
m=audio 55954 RTP/AVP 98
a=rtpmap:98 EVRCNW0/16000
a=fmtp:98 mode-set-recv=0,1,2,3,4,5,6 wb-capability=0
```

*FIG. 7A*

```
m=audio 55954 RTP/AVP 98
a=rtpmap:98 EVRCNW0/16000
a=fmtp:98 mode-set-recv=0,1,2,3,4,5,6 wb-capability=1
```

*FIG. 7B*

MECHANISM FOR DYNAMIC SIGNALING OF ENCODER CAPABILITIES

RELATED APPLICATIONS

This application is a continuation of U.S. patent application Ser. No. 13/588,445, filed Aug. 17, 2012, now U.S. Pat. No. 9,277,057, which claims the benefit of provisional patent application Ser. No. 61/524,386, filed Aug. 17, 2011, and provisional patent application Ser. No. 61/531,796, filed Sep. 7, 2011, the disclosures of which are hereby incorporated herein by reference in their entireties.

FIELD OF THE DISCLOSURE

The present disclosure relates to wideband encoders and more particularly relates to dynamic signaling of encoder capabilities.

BACKGROUND

Wideband speech encoders have been introduced over the last few years in order to allow a vast improvement in the quality and intelligibility of voice, or speech, communicated between wired or wireless communication devices. Typically, the wideband speech vocoders include voice encoders that are operable in a number of different encoder modes, and selection of an encoder mode for a given call is subject to a set of rules that, in part, depend on the standards relevant to the particular communication technology. In general, the encoder mode for a given call may be selected such that the encoder mode is either a wideband encoder mode or a narrowband encoder mode, where the selection is based on signaling protocols exercised at the time that the call is setup or, alternatively, based on in-band signaling exchanged via bearer signal packets. As an example, the Third Generation Partnership Project 2 (3GPP2) Enhanced Variable Rate Codec-Narrowband-Wideband (EVRC-NW) vocoder includes a wideband encoder mode and multiple narrowband encoder modes. Currently, the encoder mode of the EVRC-NW vocoder is determined based on the transmission of a request for a preferred encoder mode.

More specifically, when a call is established between two mobile terminals (mobile terminal A and mobile terminal B) equipped with EVRC-NW vocoders, a bearer path is established between corresponding control nodes (e.g., base stations or mobile switching centers) in the cellular communication system over a core network. This bearer path is used to carry encoded speech between the control nodes of the mobile terminals. For Code Division Multiple Access (CDMA) cellular communication systems and the EVRC family of vocoders, the bearer path over a core network is provided via Real Time Protocol (RTP) packets. As illustrated in FIG. 1, encoder mode requests are included in a dedicated field, referred to as an MMM field, in the payload headers of the RTP packets transmitted over the core network to carry encoded speech, as specified in, for example, the Internet Engineering Task Force (IETF) Request for Comment (RFC) 4788.

Notably, an RTP packet has a header and a payload. The RTP packet header carries information such as time stamp, sequence number, etc. The RTP packet header information is generic and typically independent of the payload. The payload of the RTP packet can be any media payload such as video, audio, text, etc. Here, the payload of the RTP packet is used to carry encoded speech over the core network. Specifically, the payload carries the EVRC-NW encoded speech. The EVRC-NW payload has its own header defined, which is different from the RTP packet header. The EVRC-NW payload header includes the MMM field as illustrated in FIG. 1.

One issue with the current encoder selection scheme for EVRC-NW vocoders is that the request for the preferred encoder mode is sent with no awareness of the current capability of the voice encoder of the far-end vocoder to accommodate the request. More specifically, for the call between mobile terminal A and mobile terminal B, the control node for mobile terminal A selects and requests a preferred encoder mode for the voice encoder of mobile terminal B with no awareness of the current capability of the voice encoder of mobile terminal B or limitations that may be imposed due to the call configuration. Likewise, the control node for mobile terminal B selects and requests a preferred encoder mode for the voice encoder of mobile terminal A with no awareness of the current capability of the voice encoder of mobile terminal A. As such, if for example mobile terminal A is capable of receiving and decoding wideband speech, the control node of mobile terminal A will continually request the wideband encoder mode regardless of whether the voice encoder of mobile terminal B or the call configuration can support operation in the wideband encoder mode. If the voice encoder of mobile terminal B is incapable of wideband encoding (e.g., because the communication node does not support the wideband mode, because the communication node supports the wideband encoder mode but is currently not capable of wideband encoding because the communication node is operating in a sector that does not support wideband operation, because wideband encoding is not permitted by local operator policy, or the like), the voice encoder of mobile terminal B will use some default narrowband encoder mode which may not be a preferred narrowband encoder mode of mobile terminal A. In other words, mobile terminal A will receive speech encoded according to one of the narrowband encoder modes without being aware that the voice encoder of mobile terminal B is incapable of wideband encoding and, consequently, without being able to signal a preference for a preferred narrowband encoder mode.

This problem is made worse if the wireless network operator's service policy is to proffer the highest priority to wideband operation (e.g., to gain maximum customer satisfaction especially during an introductory phase of wideband speech). In this case, there is no choice other than to keep requesting the wideband encoder mode since the reception of narrowband speech does not preclude events such as handover to a territory that supports wideband speech, which might suddenly make it possible for the voice encoder of mobile terminal B to commence transmission of wideband speech. In light of the discussion above, there is a need for an improved encoder mode selection scheme for wideband vocoders and, in particular, EVRC-NW vocoders.

SUMMARY

The present disclosure provides systems and methods for dynamically signaling encoder capabilities of vocoders of corresponding communication nodes. In one embodiment, during a call between a first communication node and a second communication node, a control node (e.g., base station controller or mobile switching center) for the first communication node sends capability information for a voice encoder of a vocoder of the first communication node to a control node for the second communication node. The voice encoder of the first communication node is capable of operating in at least some of a number of predefined encoder modes. Preferably, the predefined encoder modes include one or possibly more wideband encoder modes and one or more narrowband encoder modes. As a result of the control node of the first communication node sending the capability information for the voice encoder of the first communication node to the control node for the second communication node, the second communication node is enabled to select and request a preferred encoder mode for the voice encoder of the vocoder of the first communication node based on the capabilities of the voice encoder of the vocoder of the first communication node. Preferably, this process is dynamically repeated during the call such that, if the encoder capabilities of the voice encoder of the vocoder of the first communication node change during the call, the control node of the second communication node is enabled to select a preferred encoder mode for the voice encoder of the vocoder of the first communication node based on the new encoder capabilities of the voice encoder of the vocoder of the first communication node.

In one embodiment, the control node for the first communication node sends the capability information for the voice encoder of the vocoder of the first communication node to the control node for the second communication node in-band with encoded speech. In one particular embodiment, the vocoder of the first communication node and the vocoder of the second communication node are Enhanced Variable Rate Codec-Narrowband-Wideband (EVRC-NW) vocoders, and the control node for the first communication node transmits encoded speech encoded by the voice encoder of the vocoder of the first communication node to the control node for the second communication node over a core network as a payload of a Real Time Protocol (RTP) packet and transmits the capability information for the voice encoder of the vocoder of the first communication node in a payload header of the RTP packet.

In another embodiment, the control node for the first communication node sends the capability information for the voice encoder of the vocoder of the first communication node to the control node for the second communication node out-of-band with encoded speech. In one particular embodiment, the vocoder of the first communication node and the vocoder of the second communication node are EVRC-NW vocoders, and the control node for the first communication node transmits encoded speech encoded by the voice encoder of the vocoder of the first communication node to the control node for the second communication node over a core network as a payload of an RTP packet and transmits the capability information for the voice encoder of the vocoder of the first communication node to the control node for the second communication node out-of-band with the RTP packet. In one embodiment, the control node for the first communication node transmits the capability information to the control node for the second communication node as an attribute of a Session Description Protocol (SDP) message.

In yet another embodiment, the control node for the first communication node sends the capability information for the voice encoder of the vocoder of the first communication node to the control node for the second communication node via a control message. In one particular embodiment, the vocoder of the first communication node and the vocoder of the second communication node are EVRC-NW vocoders, and the control node for the first communication node transmits encoded speech encoded by the voice encoder of the vocoder of the first communication node to the control node for the second communication node over a core network as a payload of an RTP packet and transmits the capability information for the voice encoder of the vocoder of the first communication node to the control node of the second communication node via an RTP control message.

In another embodiment, during a call between a first communication node and a second communication node, a control node for the first communication node receives capability information for a voice encoder of a vocoder of the second communication node from a control node for the second communication node. The voice encoder of the vocoder of the second communication node is capable of operating in at least some of a number of predefined encoder modes. Preferably, the predefined encoder modes include one or more wideband encoder modes and one or more, or more preferably multiple, narrowband encoder modes. The control node for the first communication node selects a preferred encoder mode for the voice encoder of the vocoder of the second communication node based on the capabilities of the voice encoder of the vocoder of the second communication node and sends a request for the preferred encoder mode to the control node for the second communication node. Preferably, the control node for the first communication node receives dynamic updates for the capability information for the voice encoder of the vocoder of the second communication node during the call and, in response, updates the preferred encoder mode selected for the voice encoder of the vocoder of the second communication node and sends corresponding requests for the preferred encoder mode to the control node for the second communication node.

In one embodiment, the control node for the first communication node receives the capability information for the voice encoder of the vocoder of the second communication node in-band with encoded speech from the control node for the second communication node. In one particular embodiment, the vocoder of the first communication node and the vocoder of the second communication node are EVRC-NW vocoders, and the control node for the first communication node receives encoded speech from the control node for the second communication node over a core network as a payload of an RTP packet and receives the capability information for the voice encoder of the vocoder of the second communication node in a payload header of the RTP packet.

In another embodiment, the control node for the first communication node receives the capability information for the voice encoder of the vocoder of the second communication node out-of-band with encoded speech from the control node for the vocoder of the second communication node. In one particular embodiment, the vocoder of the first communication node and the vocoder of the second communication node are EVRC-NW vocoders, and the control node for the first communication node receives encoded speech from the control node for the second communication node over a core network as a payload of an RTP packet and receives the capability information for the voice encoder of the vocoder of the second communication node out-of-band with the RTP packet. In one embodiment, the control node for the first communication node receives the capability information as an attribute of an SDP message.

In yet another embodiment, the control node for the first communication node receives the capability information for the voice encoder of the vocoder of the second communication node via a control message. In one particular embodiment, the vocoder of the first communication node and the vocoder of the second communication node are EVRC-NW vocoders, and the control node for the first communication node receives encoded speech from the control node for the second communication node over a core network as a payload of an RTP packet and receives the capability information for the voice encoder of the vocoder of the second communication node via an RTP control message.

In another embodiment, during a call between a first communication node and a second communication node, a control node for the first communication node receives a wideband encoder mode request indicator and a preferred narrowband encoder mode request from a control node for the second communication node. In response, the control node for the first communication node selects a wideband encoder mode as a desired encoder mode if the wideband encoder mode request indicator indicates that the control node for the second communication node has requested the wideband encoder mode and a voice encoder of a vocoder of the first communication node is capable of operating in the wideband encoder mode. Otherwise, if the wideband encoder mode request indicator indicates that the control node for the second communication node has not requested the wideband encoder mode or if the voice encoder of the vocoder of the first communication node is not capable of operating in the wideband encoder mode, the control node for the first communication node selects a narrowband encoder mode identified by the preferred narrowband encoder mode request as the desired encoder mode. The control node for the first communication node then sends the desired encoder mode to the first communication node. In response, the voice encoder of the vocoder of the first communication node encodes speech according to the desired encoder mode and transmits the encoded speech to the control node for the first communication node for transmission to the second communication node. Preferably, this process is dynamically repeated during the call.

In one embodiment, both the wideband encoder mode request indicator and the preferred narrowband encoder mode request are received in-band with encoded speech from the control node for the second communication node. In one particular embodiment, the vocoder of the first communication node and the vocoder of the second communication node are EVRC-NW vocoders, and the control node for the first communication node receives encoded speech from the control node for the second communication node over a core network as a payload of an RTP packet and receives the wideband encoder mode request indicator and the preferred narrowband encoder mode request in a payload header of the RTP packet.

In another embodiment, the wideband encoder mode request indicator is received out-of-band with encoded speech from the control node for the second communication node. In one particular embodiment, the vocoder of the first communication node and the vocoder of the second communication node are EVRC-NW vocoders, and the control node for the first communication node receives encoded speech from the control node for the second communication node over a core network as a payload of an RTP packet. In addition, the control node for the first communication node receives the preferred narrowband encoder mode request in a payload header of the RTP packet and receives the wideband encoder mode request indicator out-of-band with the RTP packet.

In yet another embodiment, the wideband encoder mode request indicator is received via a control message from the control node for the second communication node. In one particular embodiment, the vocoder of the first communication node and the vocoder of the second communication node are EVRC-NW vocoders, and the control node for the first communication node receives encoded speech from the control node for the second communication node over a core network as a payload of an RTP packet. In addition, the control node for the first communication node receives the preferred narrowband encoder mode request in a payload header of the RTP packet and receives the wideband encoder mode request indicator via an RTP control message.

In another embodiment, during a call between a first communication node and a second communication node, a control node for the first communication node transmits a wideband encoder mode request indicator and a preferred narrowband encoder mode request to a control node for the second communication node. In response, the control node for the first communication node receives encoded speech encoded by a vocoder of the second communication node from a control node for the second communication node and then sends the encoded speech to the first communication node where the encoded speech is decoded by a vocoder of the first communication node. Preferably, the encoded speech is encoded according to a wideband encoder mode if the wideband encoder mode request indicator indicates that the control node for the first communication node has requested the wideband encoder mode and a voice encoder of the vocoder of the second communication node is capable of operating in the wideband encoder mode. Otherwise, if the wideband encoder mode request indicator indicates that the control node for the first communication node has not requested the wideband encoder mode or if the voice encoder of the vocoder of the second communication node is not capable of operating in the wideband encoder mode, the encoded speech is encoded according to a narrowband encoder mode identified by the preferred narrowband encoder mode request. Preferably, this process is dynamically repeated during the call.

In one embodiment, both the wideband encoder mode request indicator and the preferred narrowband encoder mode request are transmitted in-band with encoded speech from the control node for the first communication node to the control node for the second communication node. In one particular embodiment, the vocoder of the first communication node and the vocoder of the second communication node are EVRC-NW vocoders, and the control node for the first communication node transmits encoded speech from the vocoder of the first communication node to the control node for the second communication node over a core network as a payload of an RTP packet and transmits the wideband encoder mode request indicator and the preferred narrowband encoder mode request in a payload header of the RTP packet.

In another embodiment, the wideband encoder mode request indicator is transmitted out-of-band with encoded speech from the control node for the first communication node to the control node for the second communication node. In one particular embodiment, the vocoder of the first communication node and the vocoder of the second communication node are EVRC-NW vocoders, and the control node for the first communication node transmits encoded speech from the vocoder of the first communication node to the control node for the second communication node over a core network as a payload of an RTP packet. In addition, the control node for the first communication node transmits the preferred narrowband encoder mode request in a payload header of the RTP packet and transmits the wideband encoder mode request indicator out-of-band with the RTP packet.

In yet another embodiment, the wideband encoder mode request indicator is transmitted via a control message from the control node for the first communication node to the control node for the second communication node. In one particular embodiment, the vocoder of the first communication node and the vocoder of the second communication node are EVRC-NW vocoders, and the control node for the first communication node transmits encoded speech from the vocoder of the first communication node to the control node for the second communication node over a core network as a payload of an RTP packet. In addition, the control node for the first communication node transmits the preferred narrowband encoder mode request in a payload header of the RTP packet and transmits the wideband encoder mode request indicator via an RTP control message.

In another embodiment, during a call between a first communication node and a second communication node, a control node for the first communication node receives a wideband encoder mode request that is preceded by one or more narrowband encoder mode requests from a control node for the second communication node. In response, the control node for the first communication node selects a wideband encoder mode as a desired encoder mode if a voice encoder of a vocoder of the first communication node is capable of operating in the wideband encoder mode. Otherwise, if the voice encoder of the vocoder of the first communication node is not capable of operating in the wideband encoder mode, the control node for the first communication node selects a narrowband encoder mode identified by the one or more narrowband encoder mode requests as the desired encoder mode. The control node for the first communication node then sends an indicator of the desired encoder mode to the first communication device. In response, the voice encoder of the vocoder of the first communication node encodes speech according to the desired encoder mode and transmits the encoded speech to the control node for the first communication node, which in turn transmits the encoded speech to the control node of the second communication node. Preferably, this process is dynamically repeated during the call.

In one particular embodiment, the vocoder of the first communication node and the vocoder of the second communication node are EVRC-NW vocoders, and the control node for the first communication node receives encoded speech encoded by the vocoder of the second communication node from the control node for the second communication node over a core network as a payload of multiple RTP packets. In addition, the control node for the first communication node receives the wideband encoder mode request and the one or more narrowband encoder mode requests in payload headers of corresponding RTP packets.

In another embodiment, during a call between a first communication node and a second communication node, a control node for the first communication node transmits a wideband encoder mode request preceded by one or more narrowband encoder mode requests to a control node for the second communication node. In response, the control node for the first communication node receives encoded speech from the control node for the second communication node and transmits the encoded speech to the first communication node where the encoded speech is decoded by a vocoder of the first communication node. Preferably, the encoded speech is encoded according to a wideband encoder mode if a voice encoder of a vocoder of the second communication node is capable of operating in the wideband encoder mode. Otherwise, if the voice encoder of the vocoder of the second communication node is not capable of operating in the wideband encoder mode, the encoded speech is encoded according to a narrowband encoder mode identified by the one or more narrowband encoder mode requests.

In one particular embodiment, the vocoder of the first communication node and the vocoder of the second communication node are EVRC-NW vocoders, and the control node for the first communication node transmits encoded speech encoded by the vocoder of the first communication node to the control node for the second communication node over a core network as a payload of multiple RTP packets. In addition, the control node for the first communication node transmits the wideband encoder mode request and the one or more narrowband encoder mode requests in payload headers of corresponding RTP packets.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 7A and 7B illustrate two examples of a Session Description Protocol (SDP) offer including encoder capability information that indicates narrowband encoder mode only capability and wideband and narrowband encoder capability, respectively, according to one embodiment of the present disclosure;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 2:
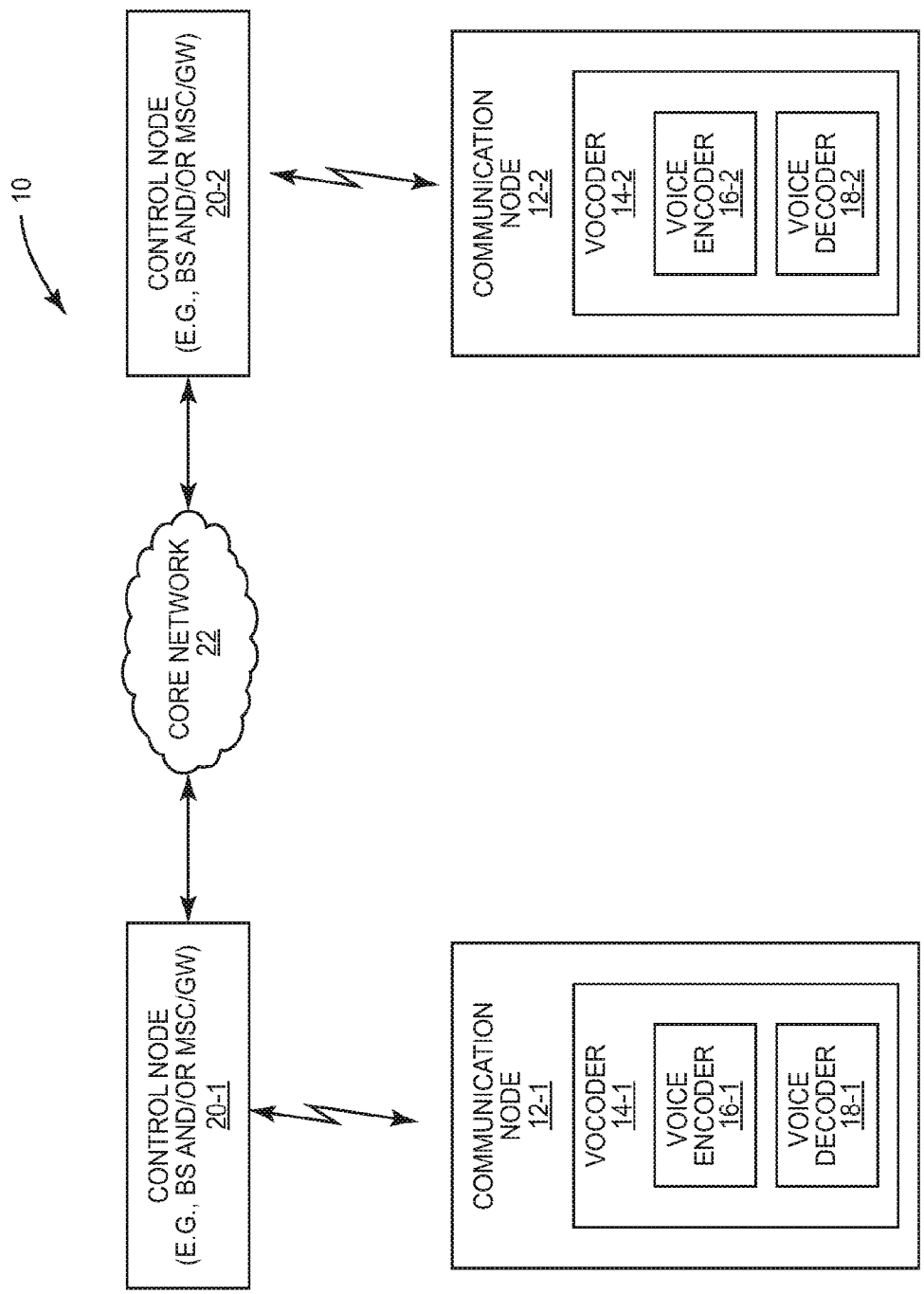
FIG. 2 illustrates a cellular communication system that implements one of a number of encoder selection schemes disclosed herein according to one embodiment of the present disclosure.

The present disclosure provides systems and methods for dynamically signaling encoder capabilities for vocoders of corresponding communication nodes. In this regard, FIG. 2 illustrates a cellular communication system 10 including communication nodes 12-1 and 12-2 having corresponding vocoders 14-1 and 14-2 wherein the cellular communication system 10 utilizes dynamic signaling of encoder capabilities for encoder mode selection according to one embodiment of the present disclosure. In the embodiments described herein, the communication nodes 12-1 and 12-2 are wireless devices such as, but not limited to, mobile phones. However, the concepts described herein are equally applicable to other types of communications nodes such as, for example, media gateways, voice messaging servers, or the like.

The vocoder 14-1 includes a voice encoder 16-1 and a voice decoder 18-1. Likewise, the vocoder 14-2 includes a voice encoder 16-2 and a voice decoder 18-2. In general, the voice encoders 16-1 and 16-2 are capable of operating in at least some of a number of predefined encoder modes. The predefined encoder modes preferably include one or more wideband encoder modes and one or more, and preferably multiple, narrowband encoder modes. As discussed below, in the preferred embodiment, the vocoders 14-1 and 14-2 are Third Generation Partnership Project 2 (3GPP2) Enhanced Variable Rate Codec-Narrowband-Wideband (EVRC-NW) vocoders that support seven different narrowband encoder modes and, optionally, a wideband encoder mode. Note, however, that the vocoders 14-1 and 14-2 are not limited to EVRC-NW vocoders. The concepts described herein are equally applicable to other type of vocoders that support multiple encoder modes.

During a call between the first and second communication nodes 12-1 and 12-2, speech encoded by the vocoder 14-1 is transmitted from the first communication node 12-1 to the second communication node 12-2 via control nodes 20-1 and 20-2 for the first and second communication nodes 12-1 and 12-2, respectively, and a core network 22. More specifically, the control nodes 20-1 and 20-2 are nodes (e.g., base station controllers or mobile switching centers (MSCs)) in the cellular communication system 10 that interconnect the communication nodes 12-1 and 12-2 to the core network 22. In one particular embodiment, the control nodes 20-1 and 20-2 are base station controllers that serve the communication nodes 12-1 and 12-2 (i.e., provide wireless service to the communication nodes 12-1 and 12-2). In this embodiment, the communication node 12-1 wirelessly transmits encoded speech generated by the voice encoder 16-1 to the control node 20-1 via an uplink. The control node 20-1 then transmits the encoded speech to the control node 20-2 over the core network 22 either directly or via one or more additional nodes in the cellular communication system 10 (e.g., a Media Gateway). Upon receiving the encoded speech, the control node 20-2 transmits the encoded speech to the communication node 12-2 via a downlink where the encoded speech is decoded by the voice decoder 18-2 of the communication node 12-2. In the same manner, encoded speech is transmitted from the communication node 12-2 to the communication node 12-1.

In another particular embodiment, the control nodes 20-1 and 20-2 are MSCs that connect base stations that serve the communication nodes 12-1 and 12-2 to the core network 22. In this embodiment, the communication node 12-1 wirelessly transmits encoded speech generated by the voice encoder 16-1 to an associated base station, which in turn transmits the encoded speech to the control node 20-1. The control node 20-1 then transmits the encoded speech to the control node 20-2 over the core network 22 either directly or via one or more additional nodes in the cellular communication system 10. Upon receiving the encoded speech, the control node 20-2 transmits the encoded speech to a base station associated with the communication node 12-2, which in turn transmits the encoded speech to the communication node 12-2 via a downlink. At the communication node 12-2, the encoded speech is decoded by the voice decoder 18-2 of the communication node 12-2. In the same manner, encoded speech is transmitted from the communication node 12-2 to the communication node 12-1.

Before proceeding, it should be noted that in many of the embodiments described herein, traffic (i.e., the encoded speech) passes through the control nodes 20-1 and 20-2. However, the control nodes 20-1 and 20-2 are not necessarily in the traffic path. For example, the control nodes 20-1 and 20-2 may be control nodes that interact with base station controllers or MSCs associated with the communication nodes 12-1 and 12-2 to select preferred encoder modes based on dynamically signaled encoder capabilities in the manner described herein.

Figure 3:
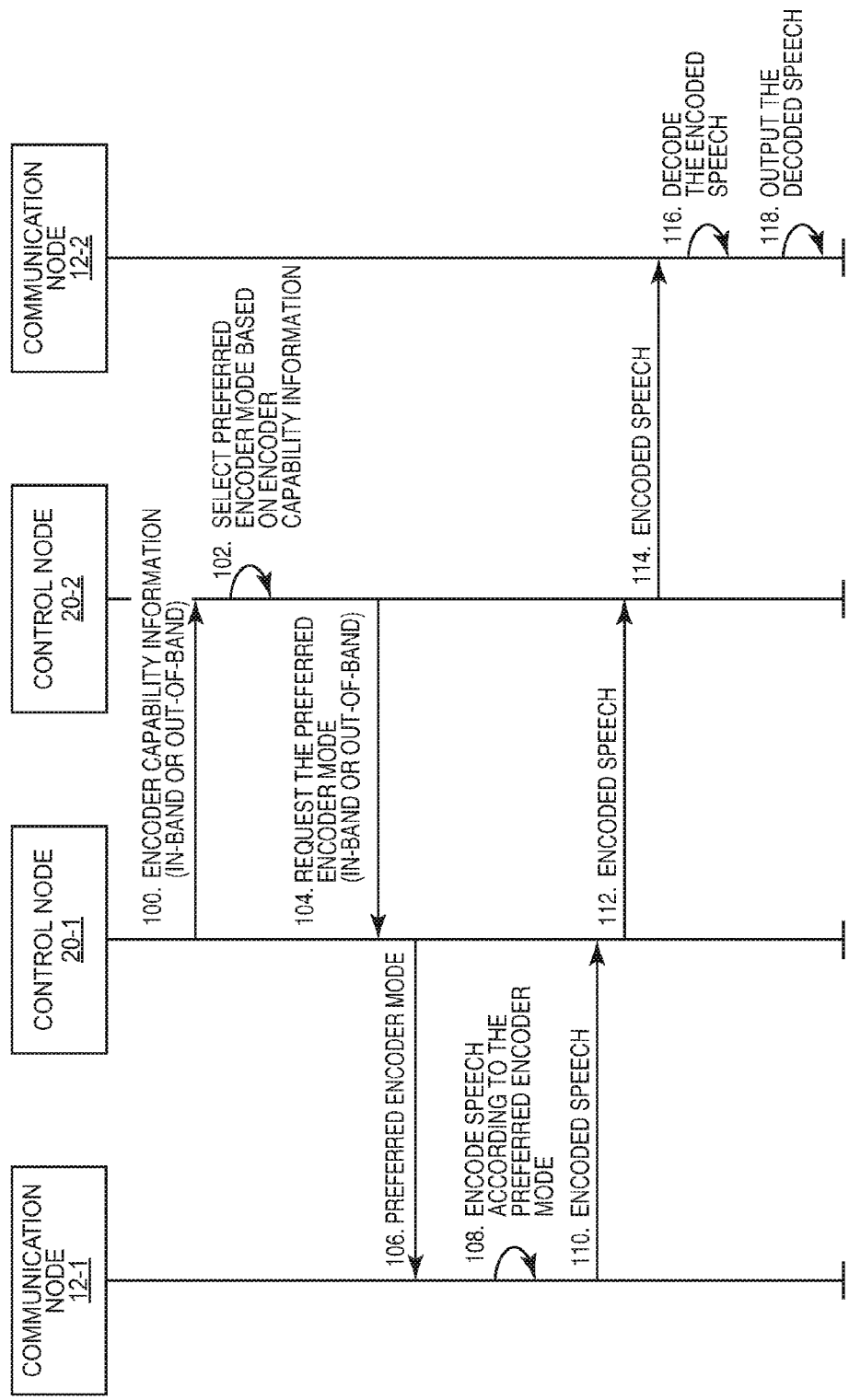
FIG. 3 illustrates the operation of the cellular communication system of FIG. 2 to enable encoder mode selection based on dynamic signaling of encoder capabilities according to one embodiment of the present disclosure.

FIG. 3 illustrates the operation of the cellular communication system 10 of FIG. 2 according to one embodiment of the present disclosure. At some point in association with a call between the communication nodes 12-1 and 12-2 (e.g., during call setup or during the call), the control node 20-1 for the communication node 12-1 sends encoder capability information for the voice encoder 16-1 of the communication node 12-1 to the control node 20-2 of the communication node 12-2 (step 100). In general, the encoder capability information indicates current capabilities of the voice encoder 16-1 with respect to one or more of the predefined encoder modes. As discussed above, in the preferred embodiment, the vocoders 14-1 and 14-2 are EVRC-NW vocoders, and the encoder capability information indicates whether the voice encoder 16-1 is capable of operating in the wideband encoder mode. As used herein, the terms "support" and "capable" are to be distinguished from one another. The voice encoder 16-1 "supports" an encoder mode when the voice encoder 16-1 is implemented by hardware or a combination of hardware and software that is designed to support the encoder mode. In contrast, the voice encoder 16-1 is "capable" of operating in an encoder mode when the voice encoder 16-1 can currently operate in the encoder mode because the voice encoder 16-1 supports the encoder mode and is not currently prohibited from operating in the encoder mode. The voice encoder 16-1 may be prohibited from operating in the encoder mode if, for example, the control node 20-1 does not support or otherwise prohibits the encoder mode. As such, the encoder capability information indicates that the voice encoder 16-1 is capable of operating in the wideband encoder mode if the voice encoder 16-1 supports the wideband encoder mode and is not currently prohibited from operating in the wideband encoder mode. Otherwise, the encoder capability information indicates that the voice encoder 16-1 is not capable of operating in the wideband encoder mode (i.e., is capable of operating only in the narrowband modes).

As discussed below, the control node 20-1 for the communication node 12-1 sends the encoder capability information for the voice encoder 16-1 of the communication node 12-1 to the control node 20-2 for the communication node 12-2 using any suitable communication technique. In some embodiments, the control node 20-1 for the communication node 12-1 sends the encoder capability information for the voice encoder 16-1 to the control node 20-2 for the communication node 12-2 in-band with encoded speech transmitted from the control node 20-1 to the control node 20-2 over the core network 22. In other embodiments, the control node 20-1 for the communication node 12-1 sends the encoder capability information for the voice encoder 16-1 to the control node 20-2 for the communication node 12-2 out-of-band with encoded speech transmitted from the control node 20-1 to the control node 20-2. Still further, in other embodiments, the control node 20-1 for the communication node 12-1 sends the encoder capability information for the voice encoder 16-1 to the control node 20-2 for the communication node 12-2 in a control message associated with a bearer signal used to transmit encoded speech from the control node 20-1 to the control node 20-2.

After receiving the encoder capability information for the voice encoder 16-1 of the communication node 12-1, the control node 20-2 for the communication node 12-2 selects a preferred encoder mode for the voice encoder 16-1 based on the encoder capability information for the voice encoder 16-1 (step 102). Thus, in contrast to the conventional encoder selection schemes where the preferred encoder mode is selected without any knowledge of the capabilities of the encoder, the control node 20-2 selects the preferred encoder mode for the voice encoder 16-1 with knowledge of the capabilities of the voice encoder 16-1. For instance, if the encoder capability information indicates that the voice encoder 16-1 is not currently capable of operating in the wideband mode, the control node 20-2 is enabled to select a preferred narrowband encoder mode (e.g., select EVRC-NW mode 1 if experiencing a light radio frequency (RF) load or EVRC-NW mode 4 if experiencing a heavy RF load) even if the control node 20-2 would have otherwise selected the wideband encoder mode. Conversely, using conventional encoder selection schemes, the control node 20-2 would select the wideband encoder mode even though the voice encoder 16-1 is not currently capable of operating in the wideband encoder mode.

Next, the control node 20-2 for the communication node 12-2 sends a request for the preferred encoder mode for the voice encoder 16-1 to the control node 20-1 (step 104). In the embodiments described herein, the request for the preferred encoder mode is sent in-band with encoded speech. However, the present disclosure is not limited thereto. Out-of-band techniques may alternatively be used. In response to the request, the control node 20-1 of the communication node 12-1 sends the preferred encoder mode, or more specifically information that identifies the preferred encoder mode, identified by the request to the communication node 12-1 (step 106).

The communication node 12-1 then configures the voice encoder 16-1 to operate in the preferred encoder mode identified in the request, and the voice encoder 16-1 encodes speech according to the preferred encoder mode (step 108). After encoding the speech, the voice encoder 16-1 transmits the encoded speech to the control node 20-1 (step 110). The control node 20-1 then transmits the encoded speech to the control node 20-2 for the communication node 12-2 via a bearer signal over the core network 22 (step 112). As discussed below, in one embodiment, the vocoders 14-1 and 14-2 are EVRC-NW vocoders, and the bearer signal is a Real Time Protocol (RTP) packet that includes the encoded speech as a payload of the RTP packet.

Upon receiving the encoded speech, the control node 20-2 of the communication node 12-2 transmits the encoded speech to the communication node 12-2 (step 114). At the communication node 12-2, the voice decoder 18-2 of the vocoder 14-2 of the communication node 12-2 decodes the encoded speech (step 116). The vocoder 14-2 of the communication node 12-2 then outputs the decoded speech (step 118). For example, the vocoder 14-2 may output the decoded speech via a speaker of the communication node 12-2.

Before proceeding, it is important to note that the process of FIG. 3 preferably continues throughout the duration of the call between the communication nodes 12-1 and 12-2. Further, while not illustrated, the control node 20-1 for the communication node 12-1 preferably dynamically updates the encoder capability information for the voice encoder 16-1. As such, if the capabilities of the voice encoder 16-1 change during the call, the new capabilities are signaled to the control node 20-2 for the communication node 12-2, and the control node 20-2 selects a new preferred encoder mode for the voice encoder 16-1 based on the new capabilities of the voice encoder 16-1. In this manner, the voice encoder 16-1 is not limited to operating in whatever encoder mode is selected at call setup, but rather may dynamically change encoder modes in response to requests issued by the control node 20-2 based on dynamically signaled encoder capability information for the voice encoder 16-1. It should also be noted that while FIG. 3 only illustrates signaling of encoder capabilities of the voice encoder 16-1 of the communication node 12-1 for clarity and ease of discussion, the capabilities of the voice encoder 16-2 are preferably signaled from the control node 20-2 to the control node 20-1 in the same manner.

Figure 4A:
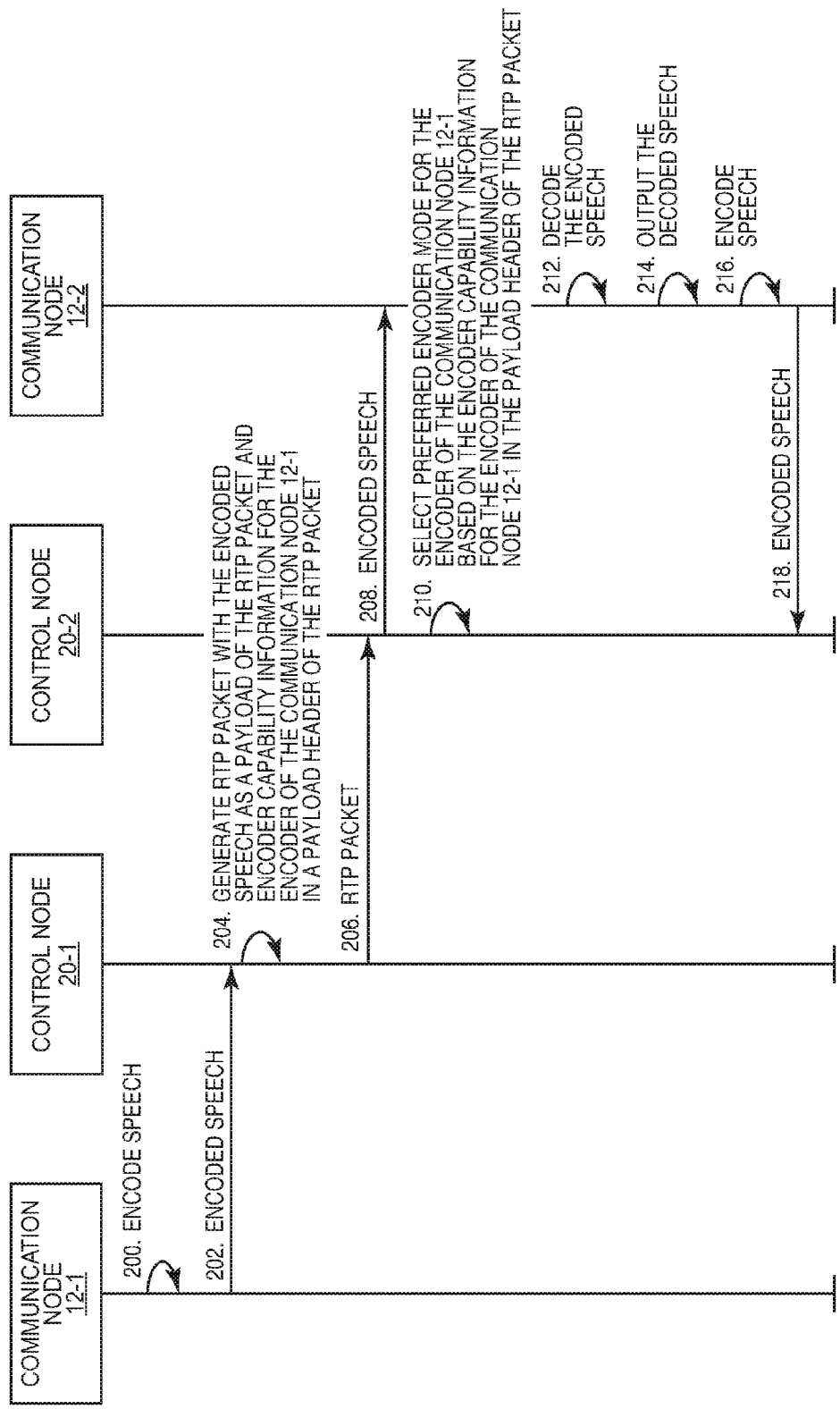
FIGS. 4A through 4C illustrate the operation of the cellular communication system of FIG. 2 to enable encoder mode selection based on dynamic in-band signaling of encoder capabilities for EVRC-NW vocoders according to one embodiment of the present disclosure.
Figure 4B:
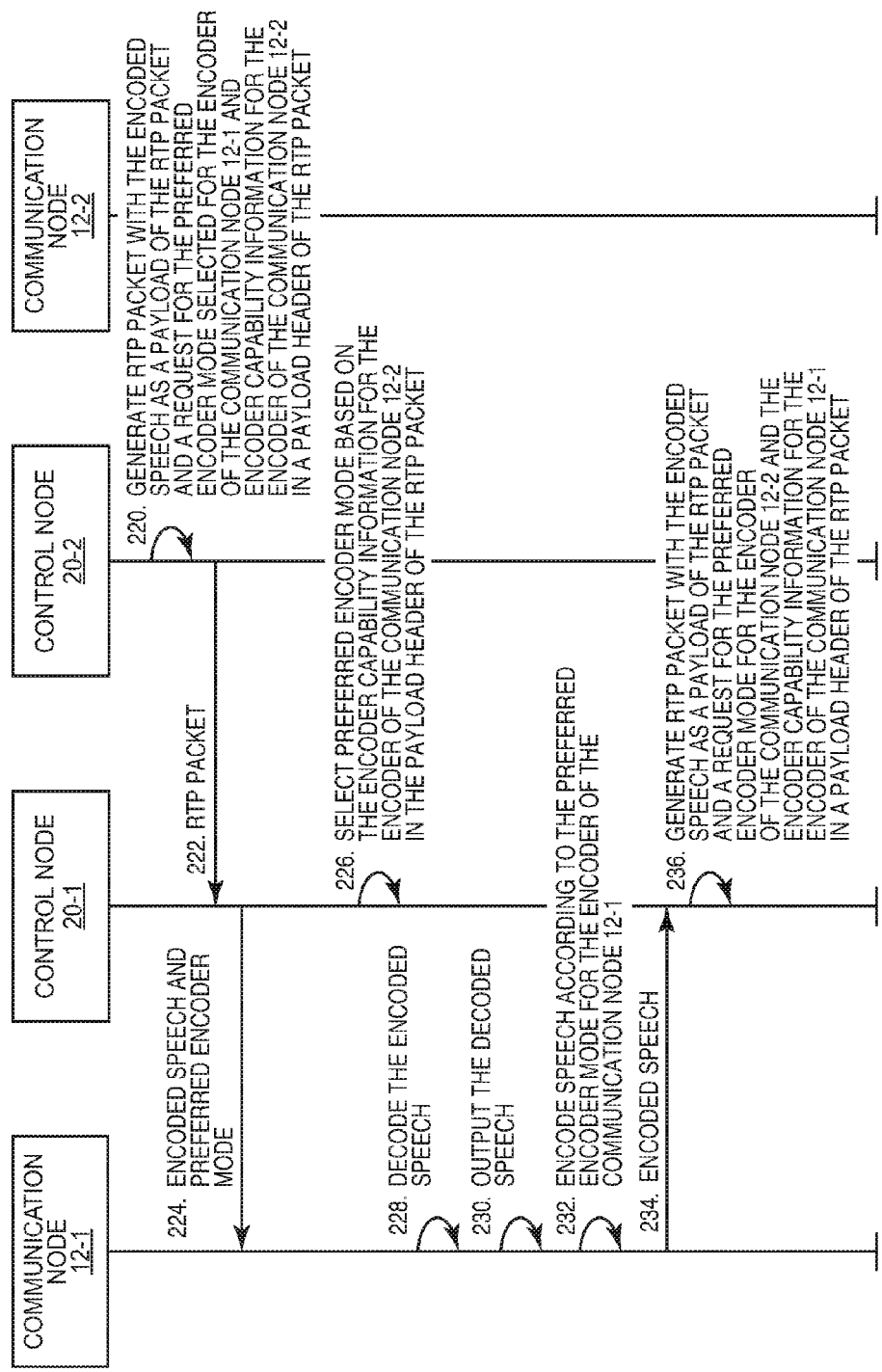
Figure 4C:
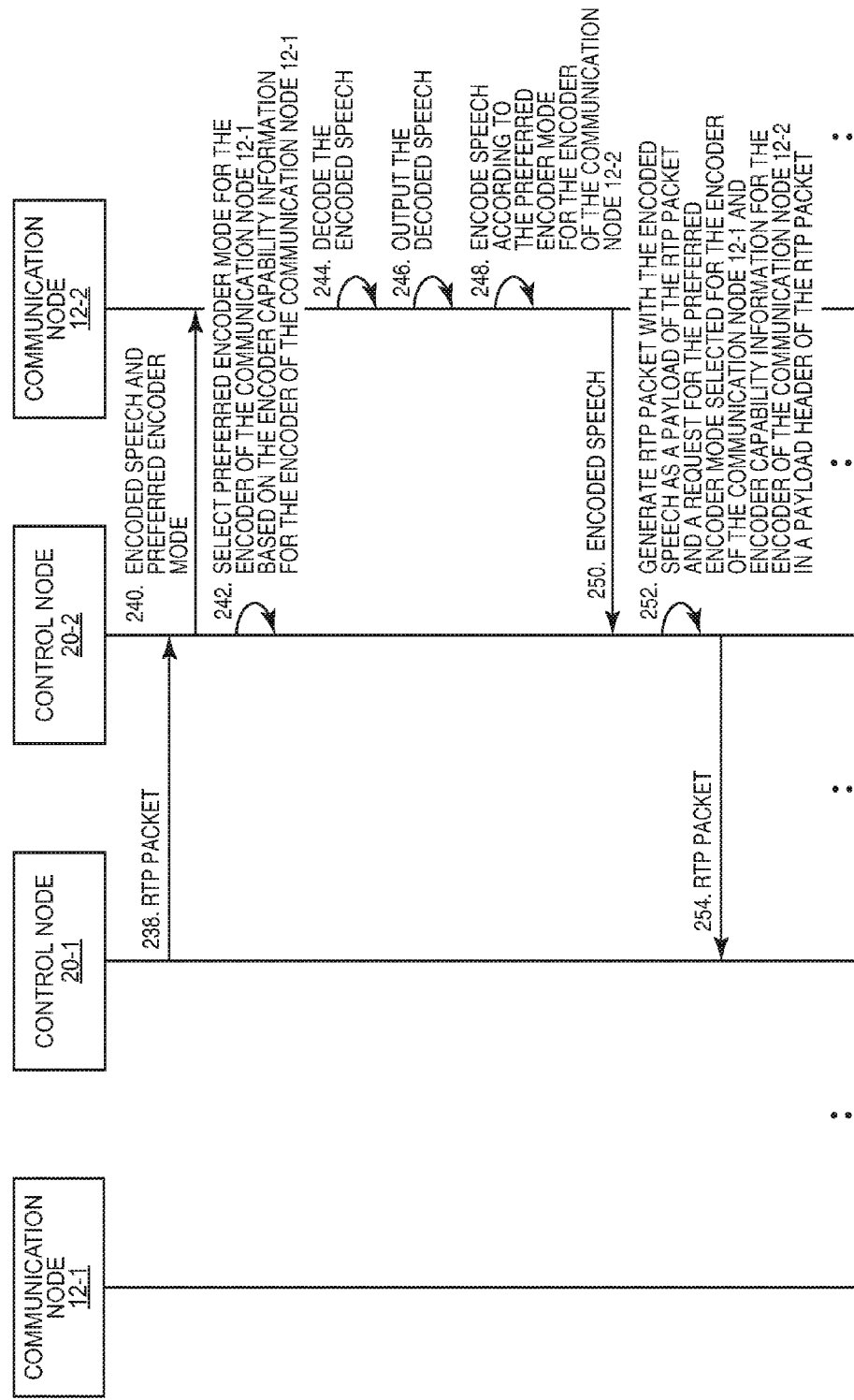

FIGS. 4A through 4C illustrate the operation of the cellular communication system 10 of FIG. 2 wherein encoder capability information is communicated in-band with encoded speech according to one embodiment of the present disclosure. In this embodiment, the vocoders 14-1 and 14-2 are EVRC-NW vocoders, and encoded speech is transported over the core network 22 in RTP packets. First, during a call between the first and second communication nodes 12-1 and 12-2, the voice encoder 16-1 of the vocoder 14-1 of the communication node 12-1 encodes speech (step 200). Initially, the voice encoder 16-1 may operate according to a default encoder mode. The communication node 12-1 then transmits the encoded speech to the control node 20-1 (step 202). Upon receiving the encoded speech, the control node 20-1 generates an RTP packet with the encoded speech received in step 202 as a payload of the RTP packet and encoder capability information for the voice encoder 16-1 of the communication node 12-1 in a payload header of the RTP packet (step 204).

Figure 1:
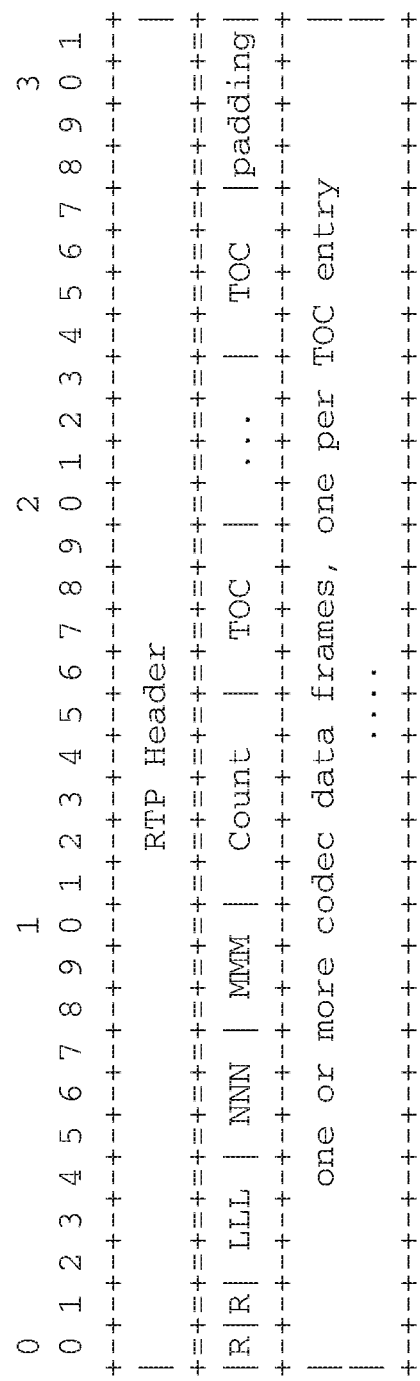
FIG. 1 illustrates a conventional Real Time Protocol (RTP) packet utilized to transport encoded speech for the Third Generation Partnership Project 2 (3GPP2) Enhanced Variable Rate Codec (EVRC) family of vocoders, including the 3GPP2 Enhanced Variable Rate Codec-Narrowband-Wideband (EVRC-NW) vocoder.
Figure 5:
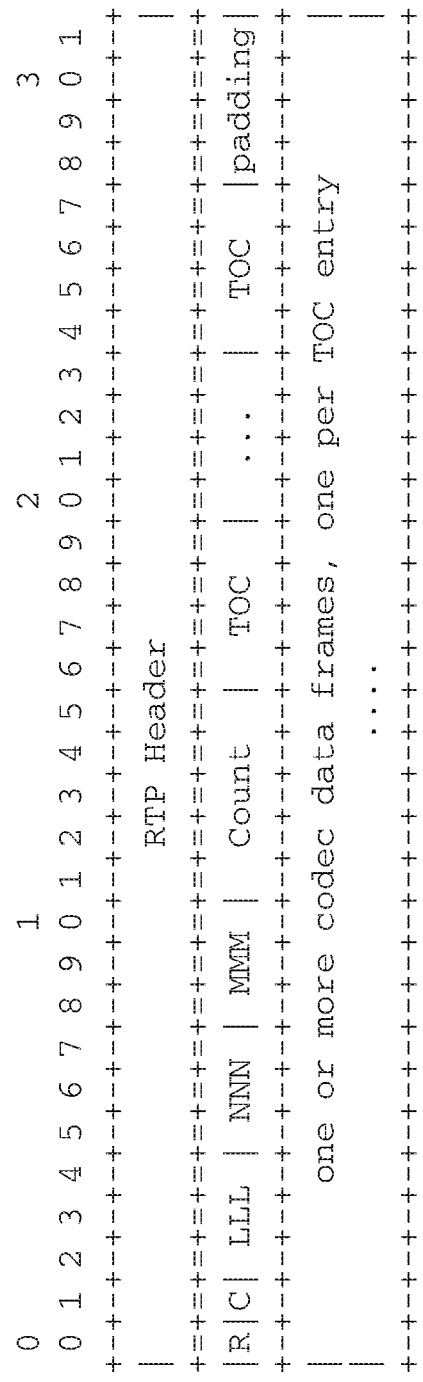
FIG. 5 illustrates one embodiment of an RTP packet that includes a payload header that enables dynamic in-band signaling of encoder capabilities for EVRC-NW vocoders according to one embodiment of the present disclosure.

Turning briefly to FIG. 5, the payload header of the RTP packet preferably has the illustrated format. More specifically, FIG. 5 illustrates an RTP packet including a header of the RTP packet (i.e., the RTP header), the payload header which includes among other things a reserved bit (R), a capability bit (C), and MMM field, and the payload which in this case is an EVRC-NW payload. Conventionally, bits 0 and 1 of the payload header were reserved bits (see FIG. 1). However, in the illustrated embodiment, bit 1 of the payload header is utilized to communicate the encoder capability information. Specifically, bit 1 of the payload header is set to 0 if the voice encoder 16-1 is capable of operating in the wideband encoder mode and is otherwise set to 1, where the value of 1 indicates that the voice encoder 16-1 is capable of operating in the narrowband encoder modes only. Note, however, that the payload header format for the RTP packet of FIG. 5 is only an example. In another embodiment, bit 1 of the payload header is set to 1 if the voice encoder 16-1 is capable of operating in the wideband encoder mode and is otherwise set to 0. In another embodiment, bits 0 and 1 of the payload header may be utilized to communicate the encoder capability information (e.g., 00 for narrowband encoder modes only and 01 for wideband and narrowband encoder mode capability). Notably, bits 0 and 1 may be beneficial if, for example, there is more than one wideband encoder mode (e.g., 00 for narrowband encoder modes only, 01 for wideband mode 1 capability, 10 for wideband mode 2 capability, and 11 for both wideband mode 1 and wideband mode 2 capability).

Returning to FIGS. 4A through 4C, once the RTP packet is generated, the control node 20-1 for the communication node 12-1 transmits the RTP packet to the control node 20-2 for the communication node 12-2 over the core network 22 (step 206). The control node 20-2 then transmits the encoded speech in the payload of the RTP packet to the communication node 12-2 (step 208). In addition, the control node 20-2 selects a preferred encoder mode for the voice encoder 16-1 of the communication node 12-1 based on the encoder capability information for the voice encoder 16-1 of the communication node 12-1 included in the payload header of the RTP packet (step 210).

At the communication node 12-2, the voice decoder 18-2 of the vocoder 14-2 of the communication node 12-2 decodes the encoded speech received from the control node 20-2 and then outputs the decoded speech (steps 212 and 214). In addition, the voice encoder 16-2 of the vocoder 14-2 of the communication node 12-2 encodes speech at the communication node 12-2 (step 216). Notably, the RTP packet received by the control node 20-2 in step 206 preferably includes a request for a preferred encoder mode for the voice encoder 16-2 in an MMM field (see FIG. 5) of the payload header of the RTP packet where the preferred encoder mode for the voice encoder 16-2 is communicated from the control node 20-2 to the communication node 12-2. However, initially, the preferred encoder mode for the voice encoder 16-2 may be selected by the control node 20-1 without knowledge of the capabilities of the voice encoder 16-2. As such, in step 216, the voice encoder 16-2 may operate according the preferred encoder mode requested in the RTP packet received by the control node 20-2 in step 206 or, if not capable of operating in the preferred encoder mode requested in the RTP packet received by the control node 20-2 in step 206, a default encoder mode.

Once the speech is encoded, the communication node 12-2 transmits the encoded speech to the control node 20-2 (step 218). Upon receiving the encoded speech, the control node 20-2 generates an RTP packet with the encoded speech received in step 218 as a payload of the RTP packet and encoder capability information for the voice encoder 16-2 and a request for the preferred encoder mode for the voice encoder 16-1 selected in step 210 in a payload header of the RTP packet (step 220). The request for the preferred encoder mode is included in the MMM field (see FIG. 5) of the payload header of the RTP packet. Once the RTP packet is generated, the control node 20-2 for the communication node 12-2 transmits the RTP packet to the control node 20-1 for the communication node 12-1 over the core network 22 (step 222). Upon receiving the RTP packet, the control node 20-1 transmits the encoded speech received in the payload of the RTP packet and the preferred encoder mode for the voice encoder 16-1 requested in the payload header of the RTP packet to the communication node 12-1 (step 224). In addition, the control node 20-1 selects a preferred encoder mode for the voice encoder 16-2 of the communication node 12-2 based on the encoder capability information for the voice encoder 16-2 included in the payload header of the RTP packet (step 226).

At the communication node 12-1, the voice decoder 18-1 of the vocoder 14-1 of the communication node 12-1 decodes the encoded speech and then outputs the decoded speech (steps 228 and 230). In addition, the voice encoder 16-1 of the vocoder 14-1 of the communication node 12-1 encodes speech at the communication node 12-1 according to the preferred encoder mode for the voice encoder 16-1 requested in the payload header of the RTP packet received by the control node 20-1 in step 222 (step 232). Once the speech is encoded, the communication node 12-1 transmits the encoded speech to the control node 20-1 (step 234). The control node 20-1 then generates an RTP packet with the encoded speech generated in step 232 as a payload of the RTP packet and encoder capability information for the voice encoder 16-1 and a request for the preferred encoder mode for the voice encoder 16-2 selected in step 226 in a payload header of the RTP packet in the manner described above (step 236). Again, the request for the preferred encoder mode is included in the MMM field (see FIG. 5) of the payload header of the RTP packet. Notably, by including the encoder capability information for the voice encoder 16-1 in each RTP packet, the encoder capability information for the voice encoder 16-1 is dynamically signaled, or communicated, from the control node 20-1 for the communication node 12-1 to the control node 20-2 for the communication node 12-2. As such, any changes in the capabilities of the voice encoder 16-1 can be signaled to the control node 20-2 immediately upon the occurrence of the change in capabilities of the voice encoder 16-1 (i.e., in the next RTP packet).

Once the RTP packet is generated, the control node 20-1 for the communication node 12-1 transmits the RTP packet to the control node 20-2 for the communication node 12-2 (step 238). Upon receiving the RTP packet, the control node 20-2 transmits the encoded speech received in the payload of the RTP packet and the preferred encoder mode for the voice encoder 16-2 requested in the payload header of the RTP packet to the communication node 12-2 (step 240). In addition, the control node 20-2 selects a preferred encoder mode for the voice encoder 16-1 of the communication node 12-1 based on the encoder capability information for the voice encoder 16-1 included in the payload header of the RTP packet (step 242).

At the communication node 12-2, the voice decoder 18-2 of the vocoder 14-2 of the communication node 12-2 decodes the encoded speech and then outputs the decoded speech (steps 244 and 246). In addition, the voice encoder 16-2 of the vocoder 14-2 of the communication node 12-2 encodes speech at the communication node 12-2 according to the preferred encoder mode for the voice encoder 16-2 requested in the payload header of the RTP packet received by the control node 20-2 in step 238 (step 248). Once the speech is encoded, the communication node 12-2 transmits the encoded speech to the control node 20-2 (step 250). The control node 20-2 then generates an RTP packet with the encoded speech generated in step 248 as a payload of the RTP packet and encoder capability information for the voice encoder 16-2 and a request for the preferred encoder mode for the voice encoder 16-1 selected in step 242 in a payload header of the RTP packet in the manner described above and then transmits the RTP packet to the control node 20-1 (steps 252 and 254). Again, the request for the preferred encoder mode is included in the MMM field (see FIG. 5) of the payload header of the RTP packet. Notably, by including the encoder capability information for the voice encoder 16-2 in each RTP packet, the encoder capability information for the voice encoder 16-2 is dynamically signaled, or communicated, from the control node 20-2 for the communication node 12-2 to the control node 20-1 for the communication node 12-1. As such, any changes in the capabilities of the voice encoder 16-2 can be signaled to the control node 20-1 immediately upon the occurrence of the change in capabilities of the voice encoder 16-2 (i.e., in the next RTP packet).

The process of FIGS. 4A through 4C continues in the manner described above until the call between the communication nodes 12-1 and 12-2 is terminated. In this manner, encoder capability information for the voice encoders 16-1 and 16-2 is dynamically signaled between the control nodes 20-1 and 20-2 and used by the control nodes 20-1 and 20-2 to select and request preferred encoder modes for the voice encoders 16-1 and 16-2. Thus, if the capabilities of either of the voice encoders 16-1 and 16-2 change during the call, a new preferred encoder mode is selected and requested during the call.

Figure 6A:
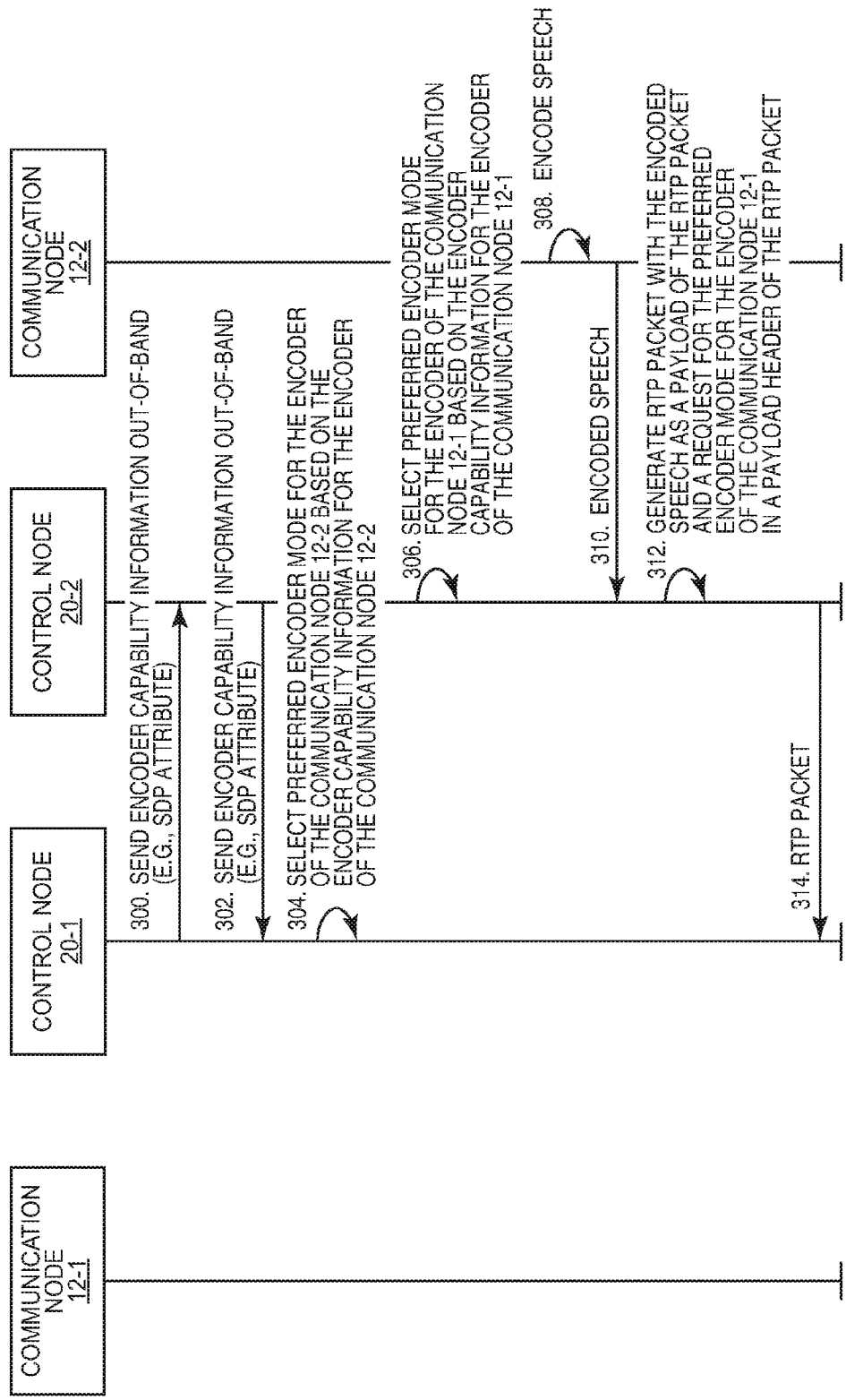
FIGS. 6A and 6B illustrate the operation of the cellular communication system of FIG. 2 to enable encoder mode selection based on dynamic out-of-band signaling of encoder capabilities for EVRC-NW vocoders according to one embodiment of the present disclosure.
Figure 6B:
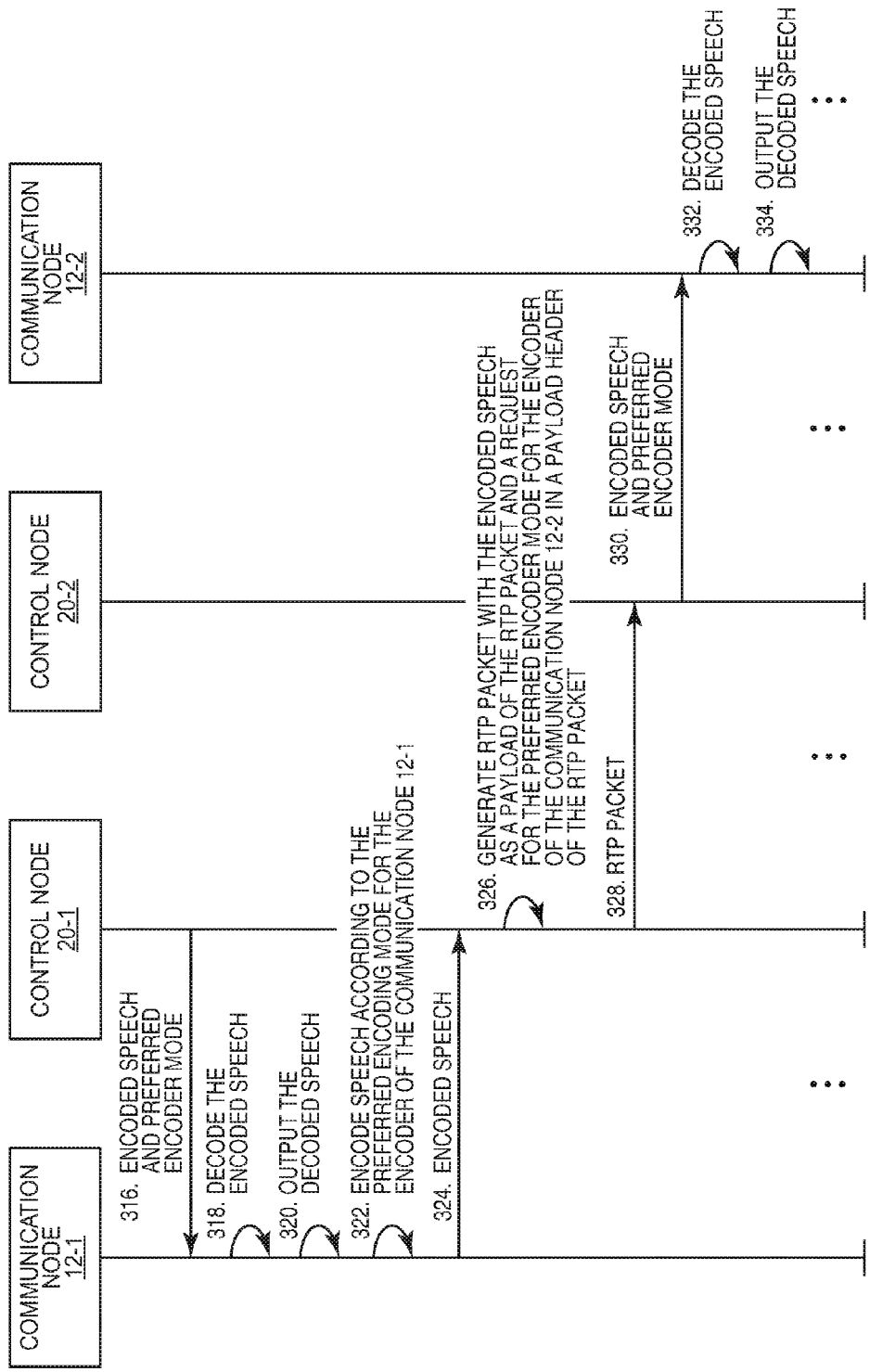

FIGS. 6A and 6B illustrate the operation of the cellular communication system 10 of FIG. 2 wherein encoder capability information is communicated out-of-band with encoded speech according to one embodiment of the present disclosure. In this embodiment, the vocoders 14-1 and 14-2 are EVRC-NW vocoders, and encoded speech is transported over the core network 22 in RTP packets. First, during call setup for a call between the first and second communication nodes 12-1 and 12-2, the control node 20-1 for the communication node 12-1 sends encoder capability information for the voice encoder 16-1 of the vocoder 14-1 of the communication node 12-1 to the control node 20-2 for the communication node 12-2 out-of-band with encoded speech (step 300). More specifically, in one particular embodiment, the call between the communication nodes 12-1 and 12-2 is a Session Initiation Protocol (SIP) based call, and the control node 20-1 sends the encoder capability information for the voice encoder 16-1 to the control node 20-2 for the communication node 12-2 as a Service Description Protocol (SDP) attribute for the SIP based call. The SDP attribute may be, for example, a single bit field or a wider bit field similar to the capability bit(s) in the payload header described above for the in-band exchange. FIGS. 7A and 7B illustrate two examples of an SDP offer including capability information that indicates narrowband encoder mode only capability (wb-capability=0) and wideband and narrowband encoder capability (wb-capability=1), respectively. Note, however, that the out-of-band signaling of the capability information is not limited to an SDP attribute. Returning to FIGS. 6A and 6B, in the same manner, the control node 20-2 for the communication node 12-2 sends encoder capability information for the voice encoder 16-2 of the vocoder 14-2 of the communication node 12-2 to the control node 20-1 for the communication node 12-1 out-of-band with encoded speech (step 302).

In this embodiment, the encoder capability information is exchanged in steps 300 and 302 during call setup for a call between the communication nodes 12-1 and 12-2. However, the encoder capability information may additionally or alternatively be exchanged during the call between the communication nodes 12-1 and 12-2, in response to a topology change (e.g., a handover to another base station controller or transfer of the call to another communication node), or as otherwise desired.

As illustrated, in this embodiment after the encoder capability information is exchanged, the control node 20-1 for the communication node 12-1 selects a preferred encoder mode for the voice encoder 16-2 of the vocoder 14-2 of the communication node 12-2 based on the encoder capability information for the voice encoder 16-2 received in step 302 (step 304). Likewise, the control node 20-2 for the communication node 12-2 selects a preferred encoder mode for the voice encoder 16-1 of the vocoder 14-1 of the communication node 12-1 based on the encoder capability information for the voice encoder 16-1 received in step 300 (step 306). As discussed above, in contrast to conventional encoder selection schemes, the control node 20-1 is dynamically aware of the current capabilities of the voice encoder 16-2 when selecting the preferred encoder mode for the voice encoder 16-2. Likewise, the control node 20-2 is aware of the capabilities of the voice encoder 16-1 when selecting the preferred encoder mode for the voice encoder 16-1. As such, the control nodes 20-1 and 20-2 can select the preferred encoder modes taking into consideration the capabilities of the voice encoders 16-1 and 16-2.

At the communication node 12-2, the voice encoder 16-2 of the vocoder 14-2 encodes speech (step 308). Initially, the voice encoder 16-2 may encode speech according to a default encoder mode. Once the speech is encoded, the communication node 12-2 transmits the encoded speech to the control node 20-2 (step 310). Upon receiving the encoded speech, the control node 20-2 generates an RTP packet with the encoded speech received in step 310 as a payload of the RTP packet and a request for the preferred encoder mode for the voice encoder 16-1 of the communication node 12-1 selected in step 306 in a payload header of the RTP packet (step 312). The request for the preferred encoder mode is included in the MMM field (see FIG. 1) of the payload header of the RTP packet. Once the RTP packet is generated, the control node 20-2 for the communication node 12-2 transmits the RTP packet to the control node 20-1 over the core network 22 (step 314).

In response to receiving the RTP packet, control node 20-1 for the communication node 12-1 transmits the encoded speech received as the payload of the RTP packet and the preferred encoder mode for the voice encoder 16-1 requested in the payload header of the RTP packet to the communication node 12-1 (step 316). The voice decoder 18-1 of the vocoder 14-1 of the communication node 12-1 then decodes the encoded speech and outputs the decoded speech (steps 318 and 320). In addition, the voice encoder 16-1 of the vocoder 14-1 of the communication node 12-1 encodes speech at the communication node 12-1 according to the preferred encoder mode requested in the header of the RTP packet received by the control node 20-1 in step 314 (step 322). Once the speech is encoded, the communication node 12-1 transmits the encoded speech to the control node 20-1 (step 324).

Upon receiving the encoded speech, the control node 20-1 generates an RTP packet with the encoded speech received in step 324 as a payload of the RTP packet and a request for the preferred encoder mode for the voice encoder 16-2 selected in step 304 in a payload header of the RTP packet in the manner described above (step 326). Again, the request for the preferred encoder mode is included in the MMM field (see FIG. 5) of the payload header of the RTP packet. Once the RTP packet is generated, the control node 20-1 for the communication node 12-1 transmits the RTP packet to the control node 20-2 for the communication node 12-2 (step 328). The control node 20-2 then transmits the encoded speech in the payload of the RTP packet and the preferred encoder mode for the voice encoder 16-2 requested in the payload header of the RTP packet to the communication node 12-2 (step 330). The voice decoder 18-2 of the vocoder 14-2 of the communication node 12-2 then decodes the encoded speech and outputs the decoded speech (steps 332 and 334).

The process of FIGS. 6A and 6B preferably continues in this manner until the call between the communication nodes 12-1 and 12-2 is terminated. In this manner, encoder capability information for the voice encoders 16-1 and 16-2 is dynamically signaled between the control nodes 20-1 and 20-2 and used by the control nodes 20-1 and 20-2 to select and request preferred encoder modes for the voice encoders 16-1 and 16-2. Thus, if the capabilities of either of the voice encoders 16-1 and 16-2 change during the call, a new preferred encoder mode is selected and requested during the call.

Figure 8A:
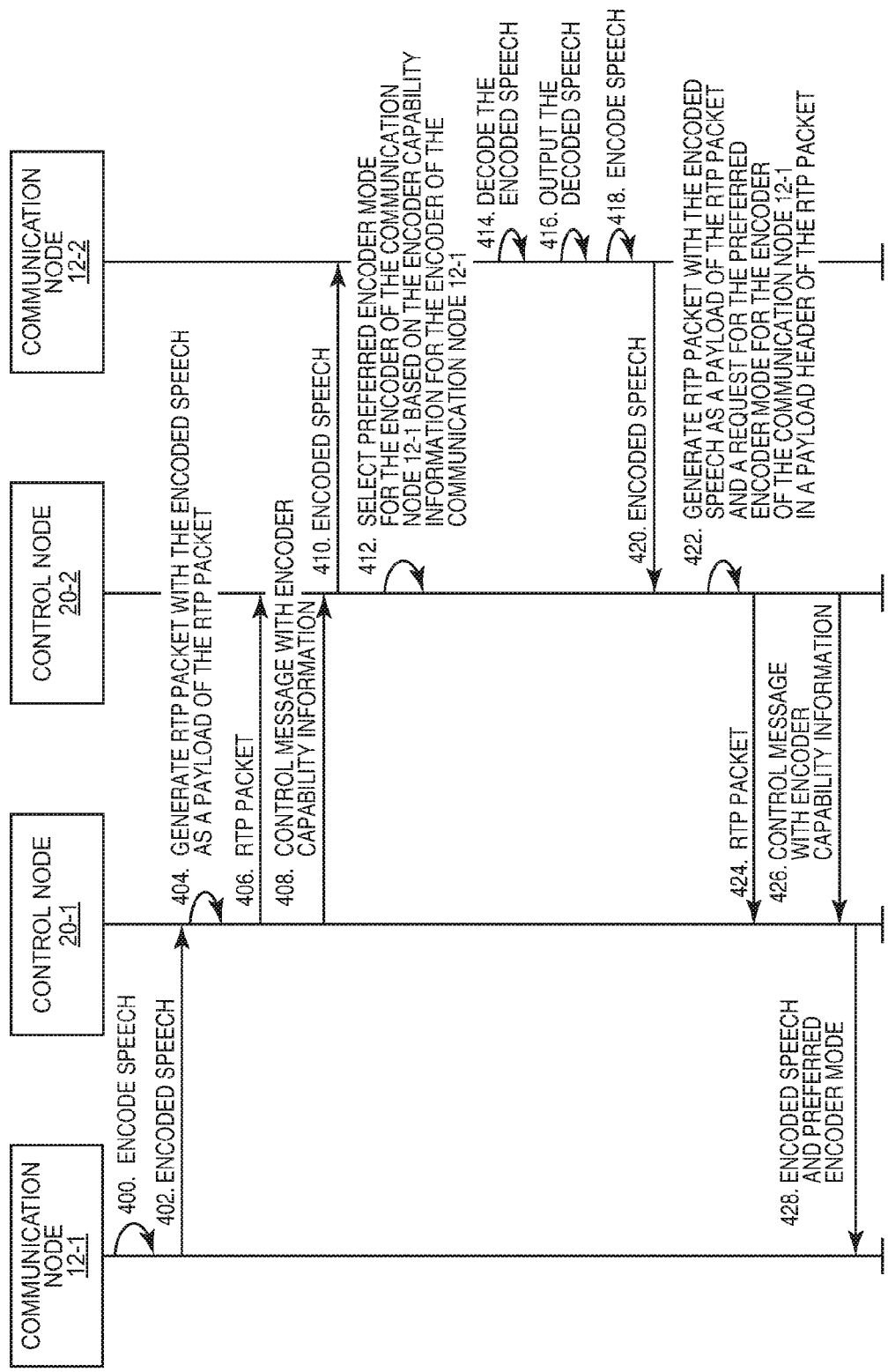
FIGS. 8A and 8B illustrate the operation of the cellular communication system of FIG. 2 to enable encoder mode selection based on dynamic exchange of control messages including encoder capability information for EVRC-NW vocoders according to one embodiment of the present disclosure.
Figure 8B:
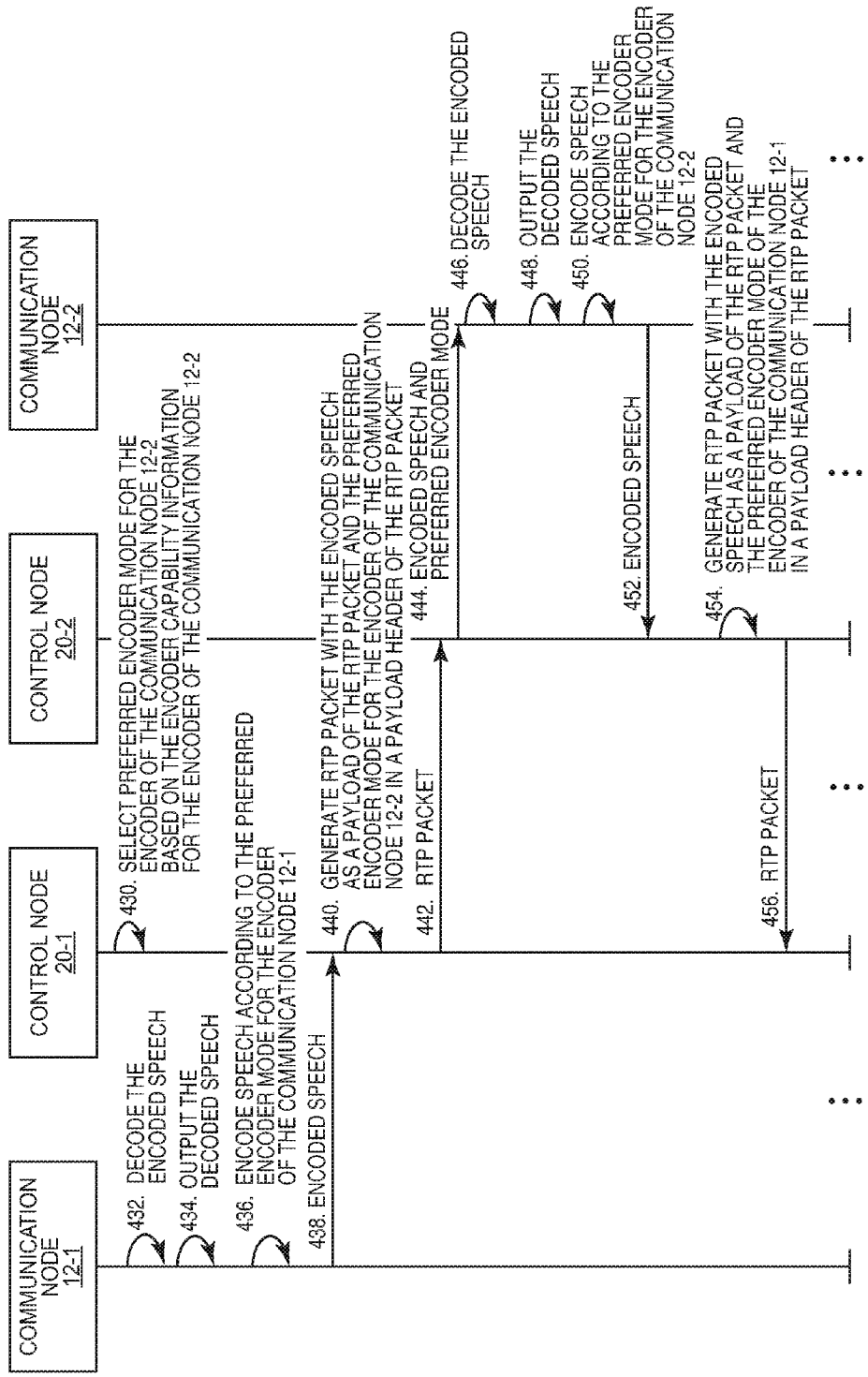

FIGS. 8A and 8B illustrate the operation of the cellular communication system 10 of FIG. 2 wherein encoder capability information is communicated via control messages associated with encoded speech according to one embodiment of the present disclosure. In this embodiment, the vocoders 14-1 and 14-2 are EVRC-NW vocoders, and encoded speech is transported over the core network 22 in RTP packets. First, during a call between the first and second communication nodes 12-1 and 12-2, the voice encoder 16-1 of the vocoder 14-1 of the communication node 12-1 encodes speech (step 400). Initially, the voice encoder 16-1 may operate according to a default encoder mode. The communication node 12-1 then transmits the encoded speech to the control node 20-1 (step 402). Upon receiving the encoded speech, the control node 20-1 generates an RTP packet with the encoded speech received in step 402 as a payload of the RTP packet (step 404). Once the RTP packet is generated, the control node 20-1 for the communication node 12-1 transmits the RTP packet to the control node 20-2 for the communication node 12-2 over the core network 22 (step 406). In addition, in this embodiment, the control node 20-1 transmits a control message including encoder capability information for the voice encoder 16-1 to the vocoder 14-2 of the communication node 12-2 to the control node 20-2 (step 408). For example, in one particular embodiment, the control message is an RTP control message such as, for instance, an RTP Control Protocol (RTCP) Source Description RTCP (SDES) packet or an RTCP SDES APP packet. Preferably, the control message includes a single or multi-bit field for the encoder capability information for the voice encoder 16-1 in a manner similar to the encoder capability bit(s) for the payload header described above. Further, in one embodiment, the control message is issued in response to a change in the encoder capability for the voice encoder 16-1 of the communication node 12-1.

In response to receiving the RTP packet, the control node 20-2 transmits the encoded speech to the communication node 12-2 (step 410). In addition, the control node 20-2 selects a preferred encoder mode for the voice encoder 16-1 of the vocoder 14-1 of the communication node 12-1 based on the encoder capability information for the voice encoder 16-1 included in the control message received in step 408 (step 412). At the communication node 12-2, the voice decoder 18-2 of the vocoder 14-2 of the communication node 12-2 decodes the encoded speech received in step 410 and then outputs the decoded speech (steps 414 and 416).

The voice encoder 16-2 of the vocoder 14-2 of the communication node 12-2 also encodes speech at the communication node 12-2 (step 418). Notably, the RTP packet received by the control node 20-2 in step 406 preferably includes a request for a preferred encoder mode for the voice encoder 16-2 in an MMM field (see FIG. 5) of the payload header of the RTP packet. The preferred encoder mode may then be communicated to the communication node 12-2. However, initially, the preferred encoder mode for the voice encoder 16-2 may be selected by the control node 20-1 without knowledge of the capabilities of the voice encoder 16-2. As such, in step 418, the voice encoder 16-2 may operate according the preferred encoder mode requested in the RTP packet received by the control node 20-2 in step 406 or, if not capable of operating in the preferred encoder mode requested in the RTP packet, a default encoder mode. Once the speech is encoded, the communication node 12-2 transmits the encoded speech to the control node 20-2 (step 420).

Upon receiving the encoded speech, the control node 20-2 generates an RTP packet with the encoded speech received in step 420 as a payload of the RTP packet and a request for the preferred encoder mode for the voice encoder 16-1 selected in step 412 in a payload header of the RTP packet (step 422). The request for the preferred encoder mode is included in the MMM field (see FIG. 1) of the payload header of the RTP packet. Once the RTP packet is generated, the control node 20-2 for the communication node 12-2 transmits the RTP packet to the control node 20-1 for the communication node 12-1 (step 424). In addition, in this embodiment, the control node 20-2 transmits a control message including encoder capability information for the voice encoder 16-2 to the control node 20-1 for the communication node 12-1 (step 426). For example, in one particular embodiment, the control message is an RTP control message such as, for instance, an RTCP SDES packet or an RTCP SDES APP packet. Preferably, the control message includes a single or multi-bit field for the encoder capability information for the voice encoder 16-2 in a manner similar to the encoder capability bit(s) for the payload header described above.

In response to receiving the RTP packet, the control node 20-1 transmits the encoded speech received as the payload of the RTP packet and the preferred encoder mode requested in the payload header of the RTP packet to the communication node 12-1 (step 428). In addition, the control node 20-1 for the communication node 12-1 selects a preferred encoder mode for the voice encoder 16-2 of the vocoder 14-2 of the communication node 12-2 based on the encoder capability information for the voice encoder 16-2 included in the control message received in step 426 (step 430). At the communication node 12-1, the voice decoder 18-1 of the vocoder 14-1 of the communication node 12-1 decodes the encoded speech and outputs the decoded speech (steps 432 and 434).

In addition, the voice encoder 16-1 of the vocoder 14-1 of the communication node 12-1 encodes speech at the communication node 12-1 according to the preferred encoder mode requested in the payload header of the RTP packet received by the control node 20-1 in step 424 (step 436). Once the speech is encoded, the communication node 12-1 transmits the encoded speech to the control node 20-1 (step 438). In response, the control node 20-1 for the communication node 12-1 generates an RTP packet with the encoded speech as a payload of the RTP packet and a request for the preferred encoder mode for the voice encoder 16-2 selected in step 430 in a payload header of the RTP packet in the manner described above (step 440). Again, the request for the preferred encoder mode is included in the MMM field (see FIG. 1) of the payload header of the RTP packet.

Once the RTP packet is generated, the control node 20-1 for the communication node 12-1 transmits the RTP packet to the control node 20-2 for the communication node 12-2 over the core network 22 (step 442). Notably, in this embodiment, the control messages with the encoder capability information are not transmitted for each RTP packet. For example, the control messages may be transmitted periodically (e.g., every 1 minute or every 5 minutes), or when there is a change of the encoder capability. Upon receiving the RTP packet, the control node 20-2 for the communication node 12-2 transmits the encoded speech received as the payload of RTP packet and the preferred encoder mode for the voice encoder 16-2 requested in the payload header of the RTP packet to the communication node 12-2 (step 444). The voice decoder 18-2 of the vocoder 14-2 of the communication node 12-2 then decodes the encoded speech and outputs the decoded speech (steps 446 and 448).

In addition, the voice encoder 16-2 of the vocoder 14-2 of the communication node 12-2 encodes speech at the communication node 12-2 according to the preferred encoder mode requested in the payload header of the RTP packet received by the control node 20-2 in step 442 (step 450). Once the speech is encoded, the communication node 12-2 transmits the encoded speech to the control node 20-2 (step 452). The control node 20-2 then generates an RTP packet with the encoded speech as a payload of the RTP packet and a request for the preferred encoder mode for the voice encoder 16-1 selected in step 412 in a payload header of the RTP packet in the manner described above (step 454). Again, the request for the preferred encoder mode is included in the MMM field (see FIG. 1) of the payload header of the RTP packet. Once the RTP packet is generated, the control node 20-2 for the communication node 12-2 transmits the RTP packet to the control node 20-1 for the communication node 12-1 (step 456). The process then continues in the manner described above until the call between the communication nodes 12-1 and 12-2 is terminated. Note, as discussed above, control messages, such as those in steps 408 and 426, are exchanged periodically or as otherwise desired to dynamically exchange the encoder capabilities of the voice encoders 16-1 and 16-2. In this manner, changes in the encoder capabilities are dynamically signaled between the communication nodes 12-1 and 12-2.

In the embodiments described thus far, the encoder capabilities are dynamically signaled between the control nodes 20-1 and 20-2 for the communication nodes 12-1 and 12-2. Then, based on the encoder capabilities of the voice encoder 16-1, the control node 20-2 is enabled to select a preferred encoder mode for the voice encoder 16-1 that is both within the capabilities of the voice encoder 16-1 and best meets the needs or desires of the control node 20-1. However, in other embodiments, the control nodes 20-1 and 20-2 address the aforementioned problems associated with conventional encoder selection schemes without dynamically signaling encoder capability information.

Figure 9:
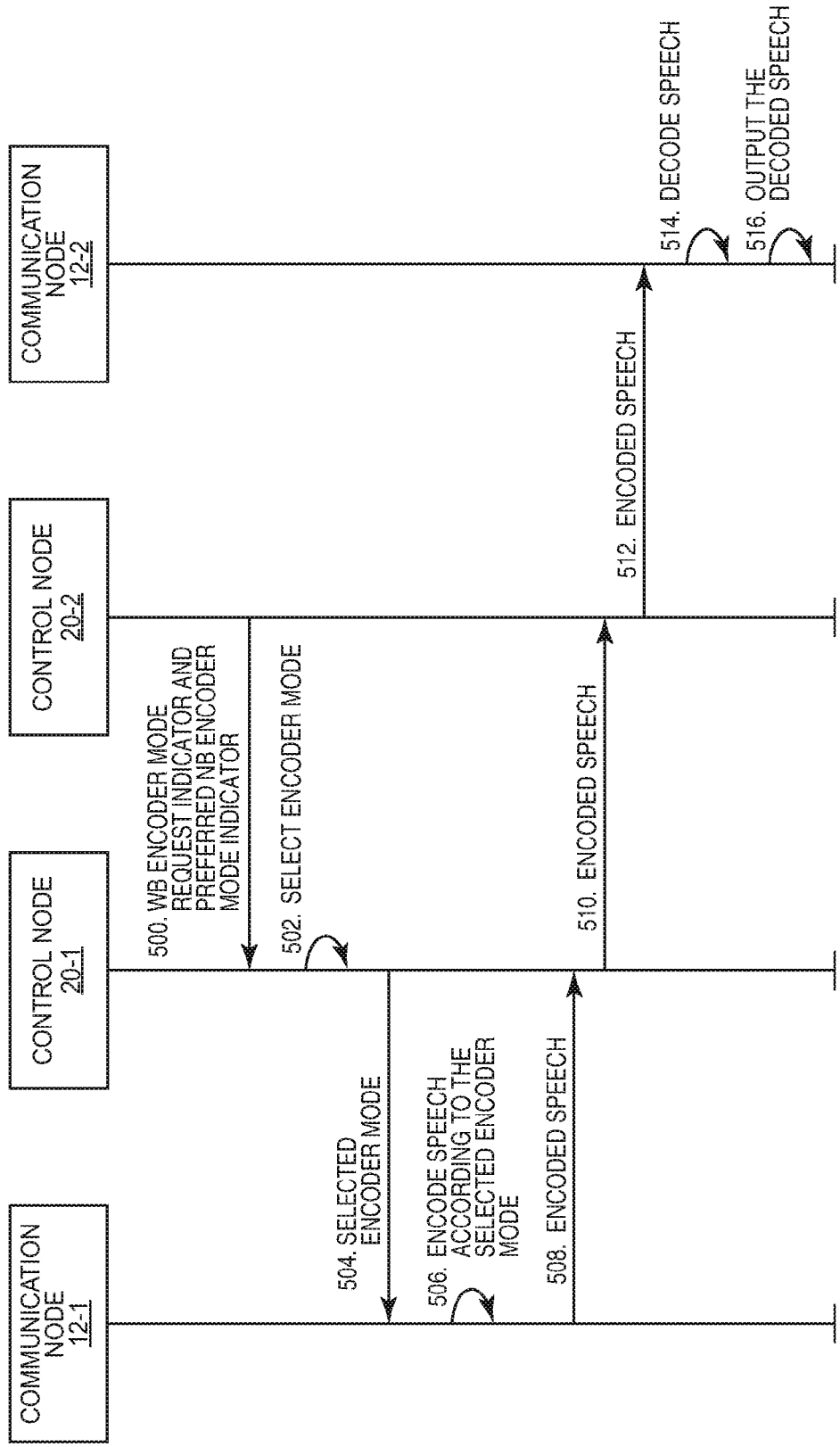
FIG. 9 illustrates the operation of the cellular communication system of FIG. 2 to enable encoder mode selection based on a wideband encoder mode request indicator and a preferred narrowband encoder mode request according to one embodiment of the present disclosure.

In this regard, FIG. 9 illustrates the operation of the cellular communication system 10 of FIG. 2 according to another embodiment of the present disclosure wherein encoder mode selection does not rely on dynamic signaling of encoder capability information. As illustrated, during a call between the first and second communication nodes 12-1 and 12-2, the control node 20-2 for the communication node 12-2 sends a wideband encoder mode request indicator and a preferred narrowband encoder mode indicator to the control node 20-1 for the communication node 12-1 (step 500). The wideband encoder mode request indicator indicates whether the control node 20-2 requests the wideband encoder mode for the voice encoder 16-1. The preferred narrowband encoder mode indicator is an indicator of a preferred narrowband encoder mode selected by the control node 20-2 for the voice encoder 16-1 of the vocoder 14-1 of the communication node 12-1. In general, if the control node 20-2 prefers that the voice encoder 16-1 use the wideband encoder mode, the control node 20-2 sets the wideband encoder mode request indicator to an appropriate value to thereby indicate that the control node 20-2 is requesting the wideband encoder mode. In addition, the control node 20-2 selects a preferred narrowband encoder mode and sets the preferred narrowband encoder mode indicator appropriately to indicate the preferred narrowband encoder mode. The preferred narrowband encoder mode is the preferred encoder mode to be used by the voice encoder 16-1 if the voice encoder 16-1 is not capable of operating in the wideband encoder mode. In contrast, if the control node 20-2 does not prefer the wideband encoder mode, the control node 20-2 sets the wideband encoder mode request indicator to an appropriate value to thereby indicate that the control node 20-2 is not requesting the wideband encoder mode. In addition, the control node 20-2 selects a preferred narrowband encoder mode and sets the preferred narrowband encoder mode indicator appropriately to indicate the preferred narrowband encoder mode. In this case, the preferred narrowband encoder mode is the preferred encoder mode to be used by the voice encoder 16-1 since the control node 20-2 has not requested the wideband encoder mode.

In one embodiment, the wideband encoder mode request indicator and the preferred narrowband encoder mode indicator are sent in-band with encoded speech. More specifically, in one particular embodiment, the vocoders 14-1 and 14-2 are EVRC-NW vocoders, and the wideband encoder mode request indicator and the preferred narrowband encoder mode indicator are transmitted in-band with encoded speech in the payload header of an RTP packet. For instance, bit 0 and/or bit 1 of the payload header may be utilized to transmit the wideband encoder mode request indicator, and the MMM field may be used to transmit the preferred narrowband encoder mode indicator (i.e., as a preferred narrowband encoder mode request).

In another embodiment, the wideband encoder mode request indicator is sent out-of-band with encoded speech. More specifically, in one particular embodiment, the vocoders 14-1 and 14-2 are EVRC-NW vocoders, and the preferred narrowband encoder mode indicator is transmitted in the MMM field (see FIG. 1) of the payload header and the wideband encoder mode request indicator is transmitted out-of-band with the RTP packet (e.g., via a SDP message). As yet another embodiment, the wideband encoder mode request indicator may be transmitted in a control message, such as an RTP control message.

Next, the control node 20-1 selects an encoder mode for the voice encoder 16-1 based on the wideband encoder mode request indicator and the preferred narrowband encoder mode indicator received from the control node 20-2 in step 500 (step 502). More specifically, if the wideband encoder mode request indicator is indicative of a wideband encoder mode request from the control node 20-2 and the voice encoder 16-1 is capable of operating in the wideband encoder mode, then the control node 20-1 selects the wideband encoder mode. If the wideband encoder mode request indicator is indicative of a wideband encoder mode request from the control node 20-2 and the voice encoder 16-1 is not capable of operating in the wideband encoder mode, then the control node 20-1 selects the narrowband encoder mode identified by the preferred narrowband encoder mode indicator received from the control node 20-2 in step 500. Conversely, if the wideband encoder mode request indicator indicates the control node 20-2 has not requested the wideband encoder mode, then the control node 20-1 selects the narrowband encoder mode identified by the preferred narrowband encoder mode indicator received from the control node 20-2 in step 500.

Once the control node 20-1 has selected the encoder mode for the voice encoder 16-1, the control node 20-1 sends the selected encoder mode, or more specifically information that identifies the selected encoder mode, to the communication node 12-1 (step 504). The voice encoder 16-1 of the vocoder 14-1 of the communication node 12-1 then encodes speech according to the selected encoder mode (step 506). The communication node 12-1 transmits the encoded speech to the control node 20-1 (step 508), which in turn transmits the encoded speech to the control node 20-2 over the core network 22 (step 510). Again, in the preferred embodiment, the vocoders 14-1 and 14-2 are EVRC-NW vocoders, and the control node 20-1 transmits the encoded speech to the control node 20-2 as a payload of an RTP packet. Upon receiving the encoded speech, the control node 20-2 sends the encoded speech to the communication node 12-2 (step 512). The voice decoder 18-2 of the vocoder 14-2 of the communication node 12-2 then decodes the encoded speech and outputs the decoded speech (steps 514 and 516). The process then continues until the call is terminated. In this manner, the wideband encoder mode request indicator and the preferred narrowband encoder mode indicator are dynamically signaled during the call and change in response to, for example, changing encoder capabilities.

Figure 10A:
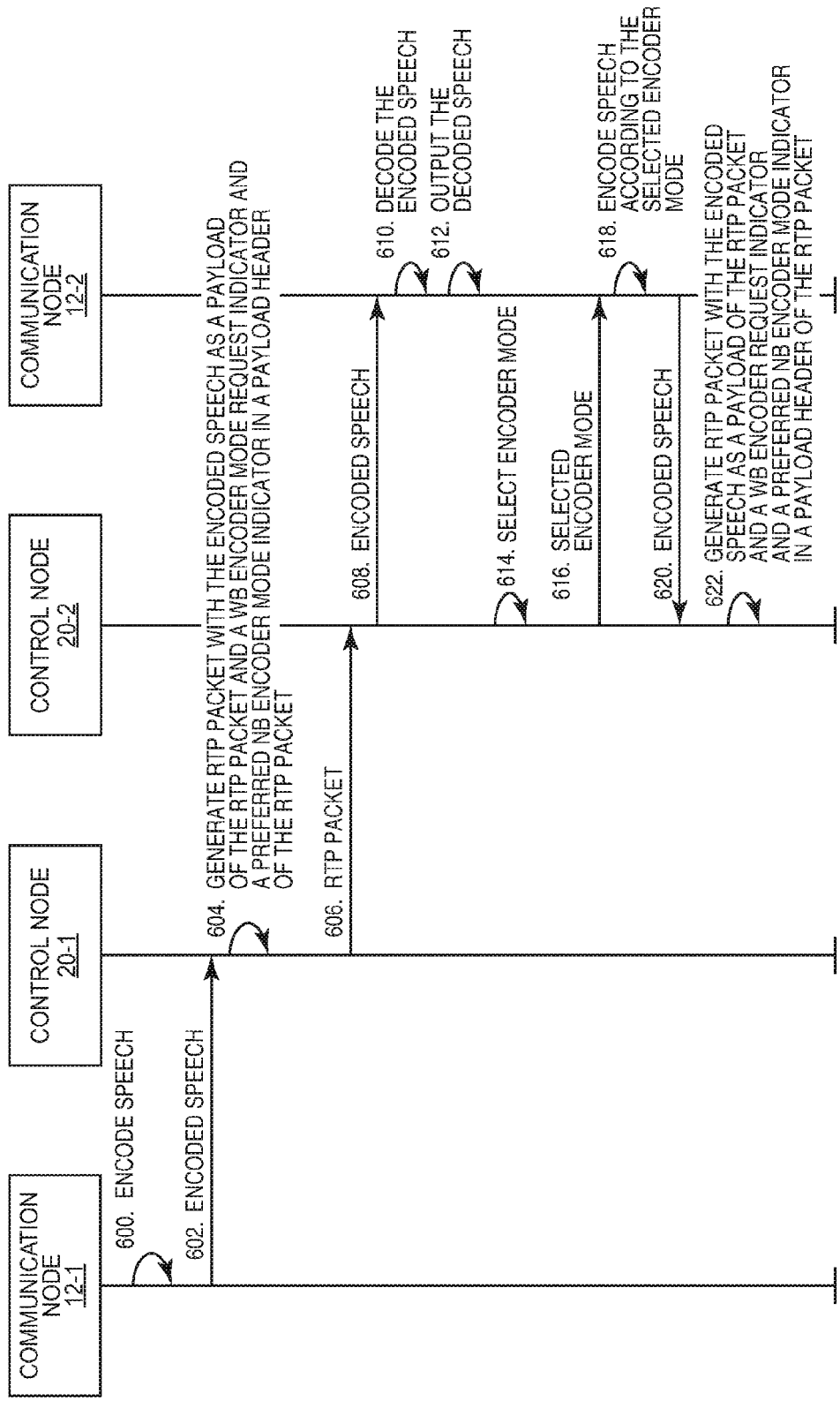
FIGS. 10A and 10B illustrate the operation of the cellular communication system of FIG. 2 to enable encoder mode selection based on a wideband encoder mode request indicator and a preferred narrowband encoder mode request communicated in-band with encoded speech for EVRC-NW vocoders according to one embodiment of the present disclosure.
Figure 10B:
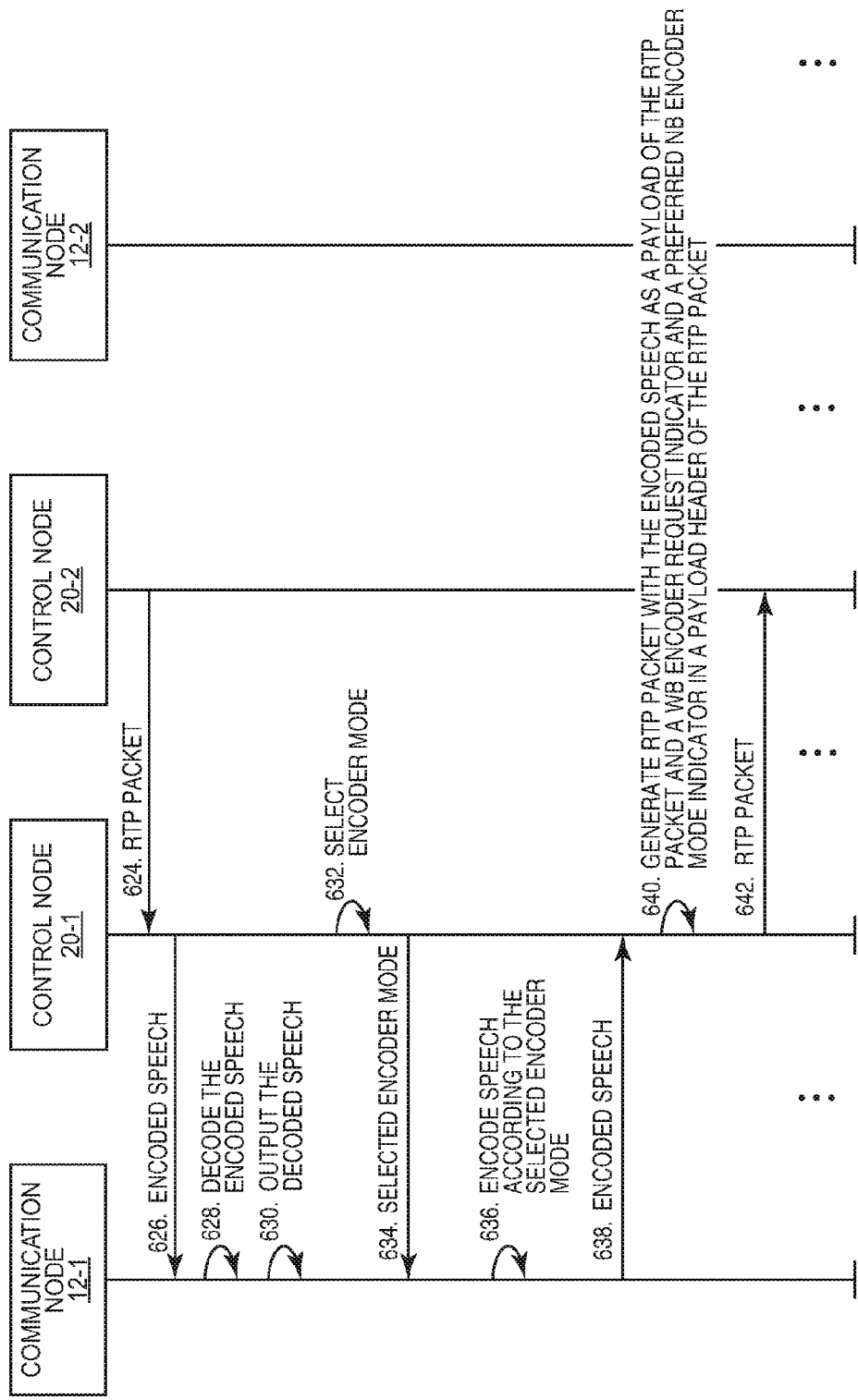

Notably, while FIG. 9 illustrates the communication of the wideband encoder mode request indicator and the preferred narrowband encoder mode indicator from the control node 20-2 to the control node 20-1 and the selection of the encoder mode of the voice encoder 16-1 based thereon, it should be appreciated that in the same manner the control node 20-1 preferably communicates a wideband encoder mode request indicator and a preferred narrowband encoder mode indicator to the control node 20-2 for use in selection of the encoder mode of the voice encoder 16-2 at the communication node 12-2. In this regard, FIGS. 10A and 10B are a more detailed illustration of the process of FIG. 9 according to one particular embodiment of the present disclosure. In this embodiment, the vocoders 14-1 and 14-2 are EVRC-NW vocoders, and encoded speech is transported over the core network 22 in RTP packets. First, during a call between the first and second communication nodes 12-1 and 12-2, the voice encoder 16-1 of the vocoder 14-1 of the communication node 12-1 encodes speech (step 600). Initially, the voice encoder 16-1 may operate according to a default encoder mode. The communication node 12-1 then transmits the encoded speech to the control node 20-1 (step 602). In response, the control node 20-1 generates an RTP packet with the encoded speech as a payload of the RTP packet and a wideband encoder mode request indicator and a preferred narrowband encoder mode indicator in a payload header of the RTP packet (step 604).

The wideband encoder mode request indicator and the preferred narrowband encoder mode indicator are configured based on the preferences of the control node 20-1 regarding the encoder mode of the voice encoder 16-2 of the vocoder 14-2 of the communication node 12-2. If the control node 20-1 prefers that the voice encoder 16-2 operates in the wideband encoder mode, the control node 20-1 configures the wideband encoder mode request indicator to be indicative of a wideband encoder mode request and configures the preferred narrowband encoder mode indicator to be indicative of a preferred narrowband mode in the event that the voice encoder 16-2 is not capable of operating in the wideband encoder mode. If the control node 20-1 does not prefer that the voice encoder 16-2 operates in the wideband encoder mode, the control node 20-1 configures the wideband encoder mode request indicator to indicate that there is no wideband encoder mode request and configures the preferred narrowband encoder mode indicator to be indicative of a preferred narrowband mode. Preferably, the wideband encoder mode request indicator is transmitted in either bit 0 or bit 1 of the payload header and is set to one bit value (e.g., 0) if the control node 20-1 does not request the wideband encoder mode and a different bit value (e.g., 1) if the control node 20-1 does request the wideband encoder mode. The preferred narrowband encoder mode indicator is preferably transmitted in the MMM field of the payload header (see FIG. 5).

Once the RTP packet is generated, the control node 20-1 for the communication node 12-1 transmits the RTP packet to the control node 20-2 for the communication node 12-2 over the core network 22 (step 606). Upon receiving the RTP packet, the control node 20-2 transmits the encoded speech received in the payload of the RTP packet to the communication node 12-2 (step 608). The voice decoder 18-2 of the vocoder 14-2 of the communication node 12-2 decodes the encoded speech and then outputs the decoded speech (steps 610 and 612). In addition, the control node 20-2 for the communication node 12-2 selects an encoder mode for the voice encoder 16-2 of the vocoder 14-2 of the communication node 12-2 based on the wideband encoder mode request indicator and the preferred narrowband encoder mode indicator received in the payload header of the RTP packet received in step 606 (step 614) and sends the selected encoder mode, or more preferably information that identifies the selected encoder mode, to the communication node 12-2 (step 616).

The voice encoder 16-2 of the vocoder 14-2 of the communication node 12-2 encodes speech at the communication node 12-2 according to the selected encoder mode (step 618) and transmits the encoded speech to the control node 20-2 (step 620). Upon receiving the encoded speech, the control node 20-2 generates an RTP packet with the encoded speech as a payload of the RTP packet and a wideband encoder mode request indicator and a preferred narrowband encoder mode indicator in a payload header of the RTP packet (step 622). The wideband encoder mode request indicator is indicative of whether the control node 20-2 requests wideband encoder mode for the voice encoder 16-1 of the vocoder 14-1 of the communication node 12-1. The preferred narrowband encoder mode indicator is indicative of a preferred encoder mode selected by the control node 20-2 for the voice encoder 16-1 of the vocoder 14-1 of the communication node 12-1.

Once the RTP packet is generated, the control node 20-2 for the communication node 12-2 transmits the RTP packet to the control node 20-1 for the communication node 12-1 over the core network 22 (step 624). Upon receiving the RTP packet, the control node 20-1 transmits the encoded speech to the communication node 12-1 (step 626). In response, the voice decoder 18-1 of the vocoder 14-1 of the communication node 12-1 decodes the encoded speech and outputs the decoded speech (steps 628 and 630). In addition, the control node 20-1 for the communication node 12-1 selects an encoder mode for the voice encoder 16-1 of the vocoder 14-1 of the communication node 12-1 based on the wideband encoder mode request indicator and the preferred narrowband encoder mode indicator received in the payload header of the RTP packet received in step 624 (step 632) and sends the selected encoder mode, or more specifically information that identifies the selected encoder mode, to the communication node 12-1 (step 634).

The voice encoder 16-1 of the vocoder 14-1 of the communication node 12-1 then encodes speech at the communication node 12-1 according to the selected encoder mode (step 636) and transmits the encoded speech to the control node 20-1 (step 638). Upon receiving the encoded speech, the control node 20-1 for the communication node 12-1 generates an RTP packet with the encoded speech as a payload of the RTP packet and a wideband encoder mode request indicator and a preferred narrowband encoder mode indicator for the vocoder 14-2 in a payload header of the RTP packet in the manner described above (step 640). Notably, by including the wideband encoder mode request indicator and the preferred narrowband encoder mode indicator in each RTP packet for the bearer signal (i.e., the signal carrying the encoded speech), the control node 20-1 is enabled to dynamically update the requested encoder modes for the voice encoder 16-2. Once the RTP packet is generated, the control node 20-1 transmits the RTP packet to the control node 20-2 for the communication node 12-2 over the core network 22 (step 642). The process then continues in the manner described above until the call between the communication nodes 12-1 and 12-2 is terminated. Using this process, each of the control nodes 20-1 and 20-2 is enabled to dynamically signal the other control node 20-1 or 20-2, concurrently, both its preference for the wideband encoder mode as well as its preferred narrowband encoder mode.

Figure 11:
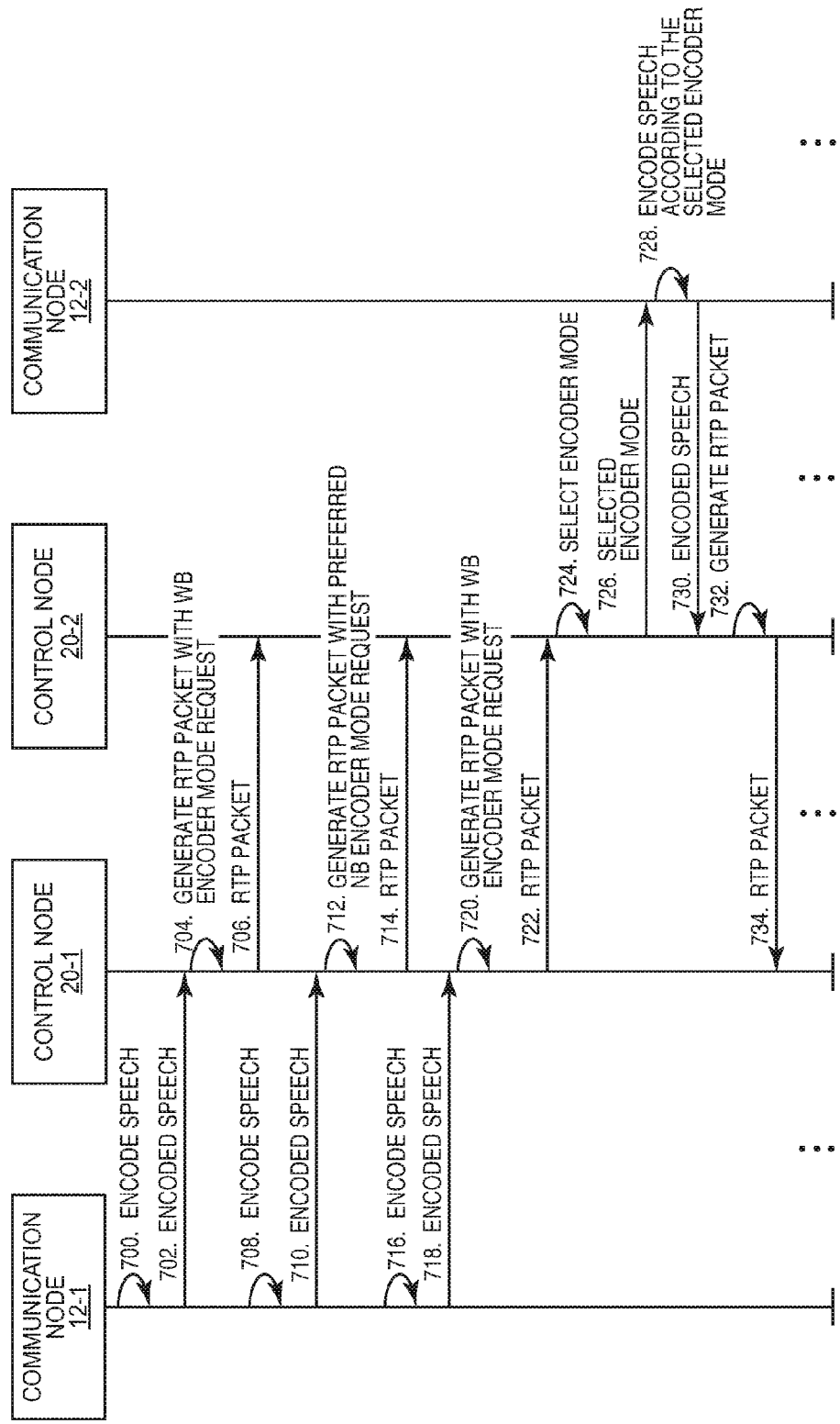
FIG. 11 illustrates the operation of the cellular communication system of FIG. 2 to enable encoder mode selection based on implicit signaling of a wideband encoder mode request and a preferred narrowband encoder mode request for EVRC-NW vocoders according to one embodiment of the present disclosure.

FIG. 11 illustrates the operation of the cellular communication system 10 according to another embodiment of the present disclosure. In general, rather than communicating additional information explicitly through in-band or out-of-band signaling, the wideband encoder mode and the preferred narrowband encoder mode are identified implicitly through a series of wideband and narrowband encoder mode requests. In particular, if the control node 20-1 prefers that the voice encoder 16-2 of the vocoder 14-2 use the wideband encoder mode, the control node 20-1 transmits a series of wideband encoder mode requests and preferred narrowband encoder mode requests. If the voice encoder 16-2 is capable of operating in the wideband encoder mode, then the voice encoder 16-2 is configured to operate in the wideband encoder mode, and the control node 20-2 ignores the preferred narrowband encoder mode requests. Conversely, if the voice encoder 16-2 is not capable of operating in the wideband encoder mode, then the voice encoder 16-2 is configured to operate in the preferred narrowband encoder mode, and the control node 20-2 ignores the wideband encoder mode requests.

More specifically, in this embodiment, the voice encoder 16-1 of the vocoder 14-1 of the communication node 12-1 encodes speech and transmits the encoded speech to the control node 20-1 (steps 700 and 702). The control node 20-1 then generates an RTP packet including the encoded speech as a payload of the RTP packet and a wideband encoder mode request in a payload header of the RTP packet (i.e., in the MMM field of the payload header) and transmits the RTP packet to the control node 20-2 via the core network 22 (steps 704 and 706). While not illustrated, the control node 20-2 sends the encoded speech to the communication node 12-2 where the encoded speech is decoded and output by the vocoder 14-2. Next, the voice encoder 16-1 of the vocoder 14-1 of the communication node 12-1 encodes speech and transmits the encoded speech to the control node 20-1 (steps 708 and 710). The control node 20-1 then generates an RTP packet including the encoded speech as a payload of the RTP packet and a narrowband encoder mode request for a preferred narrowband encoder mode in a payload header of the RTP packet (i.e., in the MMM field of the payload header) and transmits the RTP packet to the control node 20-2 over the core network 22 (steps 712 and 714). While not illustrated, the control node 20-2 sends the encoded speech to the communication node 12-2 where the encoded speech is decoded and output by the vocoder 14-2. In some embodiments, the communication node 12-1 and the control node 20-1 repeats steps 708 through 714.

Next, the voice encoder 16-1 of the vocoder 14-1 of the communication node 12-1 encodes speech and transmits the encoded speech to the control node 20-1 (steps 716 and 718). The control node 20-1 then generates an RTP packet including the encoded speech as a payload of the RTP packet and a wideband encoder mode request in a payload header of the RTP packet (i.e., in the MMM field of the payload header) and transmits the RTP packet to the control node 20-2 over the core network 22 (steps 720 and 722). Thus, in steps 706, 714, and 722, the control node 20-1 transmits periodic wideband encoder mode requests to the control node 20-2 and transmits narrowband encoder mode requests between the periodic wideband encoder mode requests. In this manner, the control node 20-1 implicitly indicates to the control node 20-2 that the control node 20-1 prefers that the voice encoder 16-2 of the vocoder 14-2 encode speech according to the wideband encoder mode and, if the voice encoder 16-2 is not capable of operating in the wideband encoder mode, the narrowband encoder mode identified by the narrowband encoder mode requests or at least a most recent narrowband encoder mode request.

At the control node 20-2 for the communication node 12-2, the control node 20-2 selects an encoder mode for the voice encoder 16-2 of the vocoder 14-2 based on the wideband and narrowband encoder mode requests from the control node 20-1 (step 724). More specifically, if the voice encoder 16-2 is capable of operating in the wideband encoder mode, the wideband encoder mode is selected. If the voice encoder 16-2 is not capable of operating in the wideband encoder mode, the narrowband encoder mode identified by the narrowband encoder mode request or at least a most recent one of the narrowband encoder mode requests is selected. The control node 20-2 then sends the selected encoder mode, or more specifically information that identifies the selected encoder mode, to the communication node 12-2 (step 726). The voice encoder 16-2 then encodes speech according to the selected encoder mode and transmits the encoded speech to the control node 20-2 (steps 728 and 730). The control node 20-2 then generates an RTP packet with the encoded speech as a payload of the RTP packet and transmits the RTP packet to the control node 20-1 over the core network 22 (steps 732 and 734).

The process of FIG. 11 then continues until the call between the communication nodes 12-1 and 12-2 is terminated. In this manner, the encoder mode preferences are dynamically signaled during the call between the communication nodes 12-1 and 12-2. Notably, while the wideband encoder mode requests and the narrowband encoder mode requests are illustrated and described as being sent from the control node 20-1 to the control node 20-2, similar wideband encoder mode requests and narrowband encoder mode requests may be sent from the control node 20-2 to the control node 20-1.

Figure 12:
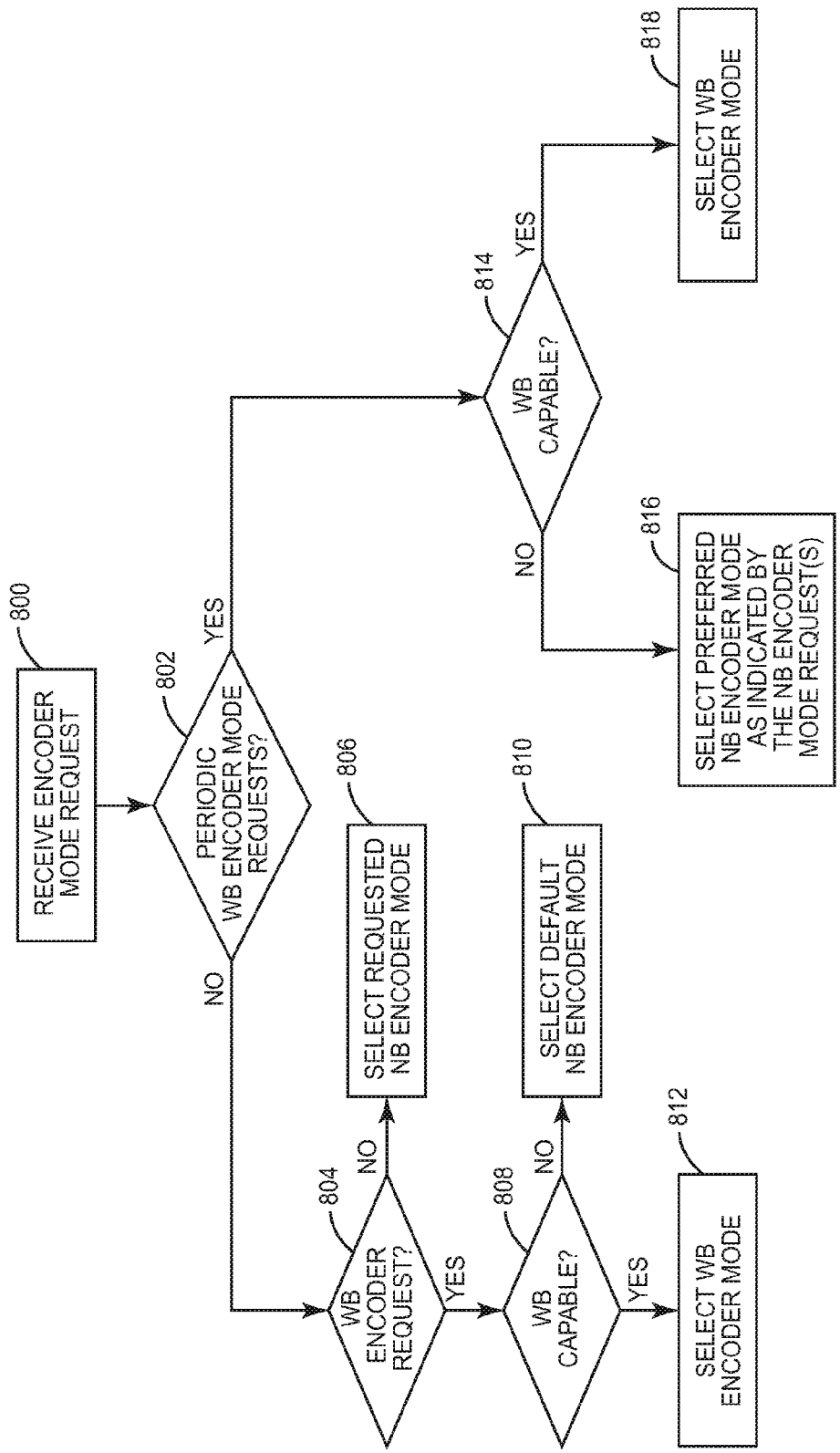
FIG. 12 is a flow chart illustrating the operation of one of the control nodes to select an encoder mode based on the process of FIG. 11 according to one embodiment of the present disclosure.

FIG. 12 is a flow chart that illustrates the operation of the control node 20-2 for the communication node 12-2 of FIG. 11 to select an encoder mode for the voice encoder 16-2 in response to an encoder mode request from the control node 20-1 according to one embodiment of the present disclosure. As illustrated, the control node 20-2 receives an encoder mode request from the control node 20-1 (step 800). In response, the control node 20-2 determines whether periodic wideband encoder mode requests have been received from the control node 20-1 during the call between the communication nodes 12-1 and 12-2 (step 802). If not, the control node 20-2 determines whether the encoder mode request is a wideband encoder mode request (step 804). If not, the encoder mode request is a narrowband encoder mode request, and the control node 20-2 selects the requested narrowband encoder mode as the encoder mode for the voice encoder 16-2 (step 806). Otherwise, if the encoder mode request is a wideband encoder mode request, the control node 20-2 determines whether the voice encoder 16-2 is capable of operating in the wideband encoder mode (step 808). If not, the control node 20-2 selects a default narrowband encoder mode as the encoder mode for the voice encoder 16-2 (step 810). Otherwise, if the voice encoder 16-2 is capable of operating in the wideband encoder mode, the control node 20-2 selects the wideband encoder mode as the encoder mode for the voice encoder 16-2 (step 812).

Returning to step 802, if the control node 20-2 has received periodic wideband encoder mode requests from the control node 20-1 during the call between the communication nodes 12-1 and 12-2, the control node 20-2 determines whether the voice encoder 16-2 is capable of operating in the wideband encoder mode (step 814). If not, the control node 20-2 selects the preferred narrowband encoder mode identified by the narrowband encoder mode requests from the control node 20-1, or at least a most recent one of the narrowband encoder mode requests from the control node 20-1, as the encoder mode for the voice encoder 16-2 (step 816). Otherwise, if the voice encoder 16-2 is capable of operating in the wideband encoder mode, the control node 20-2 selects the wideband encoder mode as the encoder mode for the voice encoder 16-2 (step 818). Using this process, the best encoder mode is selected for the voice encoder 16-2 based on the preferences of the control node 20-1 and the capabilities of the voice encoder 16-2. As the capabilities of the voice encoder 16-2 change, the encoder mode may also change depending on the preferences of the control node 20-1.

Figure 13:
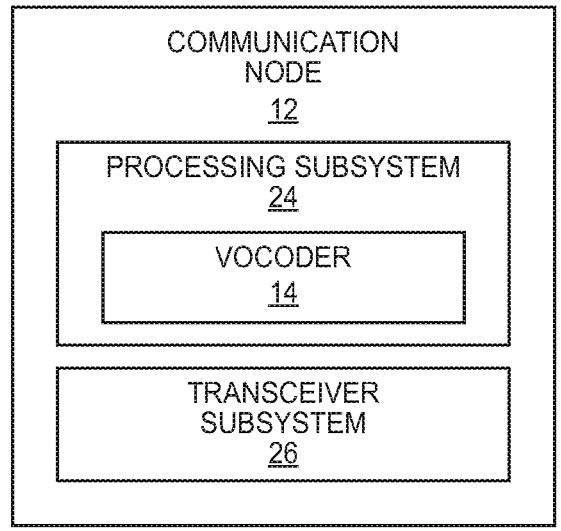
FIG. 13 is a block diagram of one of the communication nodes of FIG. 2 according to one embodiment of the present disclosure.

FIG. 13 is a block diagram of one of the communication nodes 12-1 and 12-2, which is referred to as the communication node 12, according to one embodiment of the present disclosure. The communication node 12 includes a processing subsystem 24 and a transceiver subsystem 26. The transceiver subsystem 26 generally includes analog and, in some embodiments, digital components for wirelessly sending and receiving messages to and from base stations or other wireless devices, which in one embodiment includes the control node 20-1, in the cellular communication system 10. In particular embodiments, the transceiver subsystem 26 may represent or include RF transceivers, or separate RF transmitters and receivers, capable of transmitting such messages and/or other suitable information wirelessly to base stations or other wireless devices.

The processing subsystem 24 is implemented in hardware or a combination of hardware and software. In general, the processing subsystem 24 includes a vocoder 14 of the communication node 12. In particular embodiments, the processing subsystem 24 may comprise, for example, one or several general-purpose or special-purpose microprocessors or other microcontrollers programmed with suitable software and/or firmware to carry out some or all of the functionality of the communication node 12 described herein. In addition or alternatively, the processing subsystem 24 may comprise various digital hardware blocks (e.g., one or more Application Specific Integrated Circuits (ASICs), one or more off-the-shelf digital and analog hardware components, or a combination thereof) configured to carry out some or all of the functionality of the communication node 12 described herein. Additionally, in particular embodiments, the above described functionality of the communication node 12 may be implemented, in whole or in part, by the processing subsystem 24 executing software or other instructions stored on a non-transitory computer-readable medium, such as Random Access Memory (RAM), Read Only Memory (ROM), a magnetic storage device, an optical storage device, or any other suitable type of data storage components.

Figure 14:
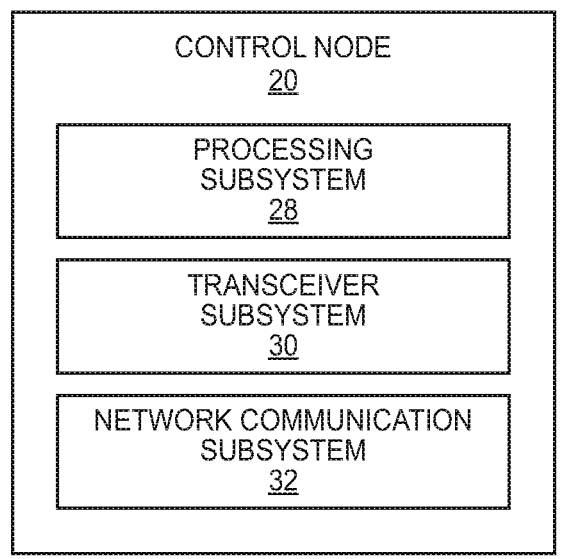
FIG. 14 is a block diagram of one of the control nodes of FIG. 2 according to one embodiment of the present disclosure.

FIG. 14 is a block diagram of one of the control nodes 20-1 and 20-2, which is referred to as the control node 20, according to one embodiment of the present disclosure. The control node 20 includes a processing subsystem 28, a transceiver subsystem 30, and a network communication subsystem 32. Notably, while the control node 20 of FIG. 14 includes both the transceiver subsystem 30 and the network communication subsystem 32, there may be embodiments where the control node 20 includes only the network communication subsystem 32 (e.g., an embodiment where the control node 20 is a MSC connected to one or more base stations and the core network 22 via the network communication subsystem 32). The transceiver subsystem 30 and the network communication subsystem 32 are generally referred to herein as communication interfaces. The transceiver subsystem 30 generally includes analog and, in some embodiments, digital components for wirelessly sending and receiving messages to and from the associated communication node 12 in the cellular communication system 10. In particular embodiments, the transceiver subsystem 30 may represent or include RF transceivers, or separate RF transmitters and receivers, capable of transmitting such messages and/or other suitable information wirelessly to the associated communication node 12. In a similar manner, the network communication subsystem 32 generally includes analog and, in some embodiments, digital components communicating over the core network 22.

The processing subsystem 28 is implemented in hardware or a combination of hardware and software. In general, the processing subsystem 28 performs some or all of the functionality of the control node 20 described herein. In particular embodiments, the processing subsystem 28 may comprise, for example, one or several general-purpose or special-purpose microprocessors or other microcontrollers programmed with suitable software and/or firmware to carry out some or all of the functionality of the control node 20 described herein. In addition or alternatively, the processing subsystem 28 may comprise various digital hardware blocks (e.g., one or more ASICs, one or more off-the-shelf digital and analog hardware components, or a combination thereof) configured to carry out some or all of the functionality of the control node 20 described herein. Additionally, in particular embodiments, the above described functionality of the control node 20 may be implemented, in whole or in part, by the processing subsystem 28 executing software or other instructions stored on a non-transitory computer-readable medium, such as RAM, ROM, a magnetic storage device, an optical storage device, or any other suitable type of data storage components.

The following acronyms are used throughout this disclosure.
- 3GPP2 Third Generation Partnership Project 2
- ASIC Application Specific Integrated Circuit
- CDMA Code Division Multiple Access
- EVRC Enhanced Variable Rate Codec
- EVRC-NW Enhanced Variable Rate Codec-Narrowband-Wideband
- MSC Mobile Switching Center
- RAM Random Access Memory
- RF Radio Frequency
- ROM Read Only Memory
- RTCP Real Time Protocol Control Protocol
- RTP Real Time Protocol
- SDES Source Description RTCP Packet
- SDP Session Description Protocol
- SIP Session Initiation Protocol Those skilled in the art will recognize improvements and modifications to the preferred embodiments of the present disclosure. All such improvements and modifications are considered within the scope of the concepts disclosed herein and the claims that follow.

What is claimed is:

1. A control node in a cellular communication system, comprising:
   one or more communication interfaces configured to communicatively couple the control node to a first communication node and a core network; and
   a processing subsystem associated with the one or more communication interfaces configured to, during a call between the first communication node and a second communication node:
   generate a first Real Time Protocol, RTP, packet comprising a payload and a payload header, the payload of the first RTP packet comprising a payload header and encoded speech for the call between the first communication node and the second communication node and the payload header of the payload of the first RTP packet comprising capability information that indicates whether a voice encoder of a vocoder of the first communication node is capable of operating in one or more wideband encoder modes; and
   send the first RTP packet from the control node to a second control node for the second communication node via the core network.

2. The control node of claim 1 wherein the processing subsystem is further configured to, during the call between the first communication node and the second communication node:
   generate a second RTP packet comprising a payload and a payload header, the payload of the second RTP packet comprising a payload header and encoded speech for the call between the first communication node and the second communication node and the payload header of the payload of the second RTP packet comprising capability information that indicates whether the voice encoder of the vocoder of the first communication node is capable of operating in the one or more wideband encoder modes; and
   send the second RTP packet from the control node to the second control node for the second communication node via the core network.

3. The control node of claim 1 wherein the capability information is one or more capability bits in the payload header of the payload of the first RTP packet that indicates whether the vocoder of the first communication node is capable of operating in the one or more wideband encoder modes.

4. The control node of claim 3 wherein the one or more wideband encoder modes comprises an Enhanced Variable Rate Codec-Narrowband-Wideband, EVRC-NW, wideband encoder mode.

5. The control node of claim 4 wherein the one or more capability bits consist of bit 1 of the payload header of the first RTP packet.

6. The control node of claim 5 wherein, in order to generate the first RTP packet, the processing subsystem is further configured to set bit 1 of the payload header of the first RTP packet to 0 if the voice encoder of the vocoder of the first communication node is capable of operating in the EVRC-NW wideband encoder mode.

7. The control node of claim 6 wherein, in order to generate the first RTP packet, the processing subsystem is further configured to set bit 1 of the payload header of the first RTP packet to 1 if the voice encoder of the vocoder of the first communication node is capable of operating in one or more narrowband encoder modes only.

8. The control node of claim 1 wherein the control node is a base station controller serving the first communication node.

9. The control node of claim 1 wherein the control node is a mobile switching center for a base station serving the first communication node.

10. A method of operation of a control node in a cellular communication system, the control node communicatively coupled to a first communication node, comprising:
   during a call between the first communication node and a second communication node:
   generating a first Real Time Protocol, RTP, packet comprising a payload and a payload header, the payload of the first RTP packet comprising a payload header and encoded speech for the call between the first communication node and the second communication node and the payload header of the payload of the first RTP packet comprising capability information that indicates whether a voice encoder of a vocoder of the first communication node is capable of operating in one or more wideband encoder modes; and sending the first RTP packet from the control node to a second control node for the second communication node via a core network.

11. The method of claim 10 further comprising, during the call between the first communication node and the second communication node:

generating a second RTP packet comprising a payload and a payload header, the payload of the second RTP packet comprising a payload header and encoded speech for the call between the first communication node and the second communication node and the payload header of the payload of the second RTP packet comprising capability information that indicates whether the voice encoder of the vocoder of the first communication node is capable of operating in the one or more wideband encoder modes; and sending the second RTP packet from the control node to the second control node for the second communication node via the core network.

12. The method of claim 10 wherein the capability information is one or more capability bits in the payload header of the payload of the first RTP packet that indicates whether the vocoder of the first communication node is capable of operating in the one or more wideband encoder modes.

13. The method of claim 12 wherein the one or more wideband encoder modes comprises an Enhanced Variable Rate Codec-Narrowband-Wideband, EVRC-NW, wideband encoder mode.

14. The method of claim 13 wherein the one or more capability bits consist of bit 1 of the payload header of the first RTP packet.

15. The method of claim 14 wherein generating the first RTP packet comprises setting bit 1 of the payload header of the first RTP packet to 0 if the voice encoder of the vocoder of the first communication node is capable of operating in the EVRC-NW wideband encoder mode.

16. The method of claim 15 wherein generating the first RTP packet further comprises setting bit 1 of the payload header of the first RTP packet to 1 if the voice encoder of the vocoder of the first communication node is capable of operating in one or more narrowband encoder modes only.

17. The method of claim 10 wherein the control node is a base station controller serving the first communication node.

18. The method of claim 10 wherein the control node is a mobile switching center for a base station serving the first communication node.

* * * * *